United States Patent
Cohen et al.

(10) Patent No.: US 10,152,136 B2
(45) Date of Patent: Dec. 11, 2018

(54) VELOCITY FIELD INTERACTION FOR FREE SPACE GESTURE INTERFACE AND CONTROL

(71) Applicant: Leap Motion, Inc., San Francisco, CA (US)

(72) Inventors: Isaac Cohen, San Francisco, CA (US); David S Holz, San Francisco, CA (US); Maxwell Sills, San Francisco, CA (US)

(73) Assignee: LEAP MOTION, INC., San Francisco, CA (US)

( * ) Notice: Subject to any disclaimer, the term of this patent is extended or adjusted under 35 U.S.C. 154(b) by 7 days.

(21) Appl. No.: 14/516,493

(22) Filed: Oct. 16, 2014

(65) Prior Publication Data

US 2015/0103004 A1  Apr. 16, 2015

Related U.S. Application Data

(60) Provisional application No. 61/891,880, filed on Oct. 16, 2013.

(51) Int. Cl.
*G06F 3/01* (2006.01)
*G06K 9/00* (2006.01)
*G06F 3/0481* (2013.01)
*G06F 3/0483* (2013.01)
*G06F 3/0485* (2013.01)
*G06F 3/0484* (2013.01)

(52) U.S. Cl.
CPC ............ *G06F 3/017* (2013.01); *G06F 3/0483* (2013.01); *G06F 3/0485* (2013.01); *G06F 3/04815* (2013.01); *G06F 3/04842* (2013.01); *G06F 3/04847* (2013.01); *G06K 9/00355* (2013.01)

(58) Field of Classification Search
CPC .................................................... G06F 3/04815
See application file for complete search history.

(56) References Cited

U.S. PATENT DOCUMENTS

| | | | | |
|---|---|---|---|---|
| 5,454,043 A | * | 9/1995 | Freeman | A61B 5/1121 345/419 |
| 5,594,469 A | * | 1/1997 | Freeman | G05B 19/106 345/157 |
| 6,002,808 A | * | 12/1999 | Freeman | G06F 3/017 348/171 |

(Continued)

OTHER PUBLICATIONS

Pavlovic, V., et al., "Visual Interpretation of Hand Gestures for Human-Computer Interaction: A Review," IEEE Transactions on Pattern Analysis and Machine Intelligence, vol. 19, No. 7, Jul. 1997, pp. 677-695.

(Continued)

*Primary Examiner* — Benyam Ketema
(74) *Attorney, Agent, or Firm* — Haynes Beffel & Wolfeld LLP; Ernest J. Beffel, Jr.; Andrew L. Dunlap

(57) ABSTRACT

The technology disclosed relates to automatically interpreting a gesture of a control object in a three dimensional sensor space by sensing a movement of the control object in the three dimensional sensor space, sensing orientation of the control object, defining a control plane tangential to a surface of the control object and interpreting the gesture based on whether the movement of the control object is more normal to the control plane or more parallel to the control plane.

26 Claims, 21 Drawing Sheets

(56) References Cited

U.S. PATENT DOCUMENTS

| | | | |
|---|---|---|---|
| 6,191,773 B1* | 2/2001 | Maruno | G06F 3/017 345/156 |
| 6,788,809 B1* | 9/2004 | Grzeszczuk | G06F 3/017 345/419 |
| 7,095,401 B2* | 8/2006 | Liu | G06F 3/017 345/156 |
| 7,598,942 B2 | 10/2009 | Underkoffler et al. | |
| 8,150,102 B2* | 4/2012 | Zheng | G06F 3/017 382/103 |
| 8,373,654 B2* | 2/2013 | Wang | G06F 3/017 345/156 |
| 8,487,871 B2* | 7/2013 | Langridge | G06F 3/011 345/157 |
| 8,933,876 B2* | 1/2015 | Galor | G06F 3/005 345/156 |
| 2002/0041327 A1* | 4/2002 | Hildreth | G06F 3/011 348/42 |
| 2007/0216894 A1* | 9/2007 | Garcia | G01B 11/2545 356/4.01 |
| 2008/0056561 A1* | 3/2008 | Sawachi | G06K 9/32 382/154 |
| 2008/0244465 A1* | 10/2008 | Kongqiao | G06F 3/017 715/863 |
| 2009/0040215 A1* | 2/2009 | Afzulpurkar | G06K 9/00355 345/419 |
| 2009/0217211 A1* | 8/2009 | Hildreth | G06F 3/017 715/863 |
| 2009/0265671 A1* | 10/2009 | Sachs | G06F 3/017 715/863 |
| 2010/0235786 A1* | 9/2010 | Maizels | G06F 3/011 715/810 |
| 2010/0275159 A1* | 10/2010 | Matsubara | G06F 3/011 715/810 |
| 2011/0107270 A1* | 5/2011 | Wang | G06F 19/3481 715/850 |
| 2011/0173204 A1 | 7/2011 | Murillo et al. | |
| 2011/0254765 A1* | 10/2011 | Brand | G06F 3/017 345/158 |
| 2012/0038549 A1 | 2/2012 | Mandella et al. | |
| 2012/0069168 A1* | 3/2012 | Huang | G06F 3/017 348/77 |
| 2012/0194517 A1 | 8/2012 | Izadi et al. | |
| 2012/0206339 A1* | 8/2012 | Dahl | G06F 3/043 345/156 |
| 2012/0257035 A1* | 10/2012 | Larsen | G06F 3/013 348/78 |
| 2012/0268410 A1 | 10/2012 | King et al. | |
| 2012/0313848 A1* | 12/2012 | Galor | G06F 3/005 345/156 |
| 2013/0033483 A1* | 2/2013 | Im | G06F 3/017 345/419 |
| 2013/0182902 A1 | 7/2013 | Holz | |
| 2013/0278499 A1* | 10/2013 | Anderson | G06F 3/01 345/156 |
| 2013/0293454 A1* | 11/2013 | Jeon | G06F 3/017 345/156 |
| 2014/0089849 A1* | 3/2014 | Choi | G06F 3/017 715/810 |
| 2015/0169076 A1 | 6/2015 | Cohen et al. | |
| 2015/0169175 A1 | 6/2015 | Cohen et al. | |
| 2015/0169176 A1* | 6/2015 | Cohen | G06F 3/04815 715/852 |
| 2015/0220776 A1 | 8/2015 | Cronholm | |
| 2015/0338998 A1* | 11/2015 | Chathoth | G06F 3/0425 345/175 |

OTHER PUBLICATIONS

Wu, Y., et al., "Vision-Based Gesture Recognition: A Review," Beckman Institute, Copyright 1999, pp. 103-115.

* cited by examiner

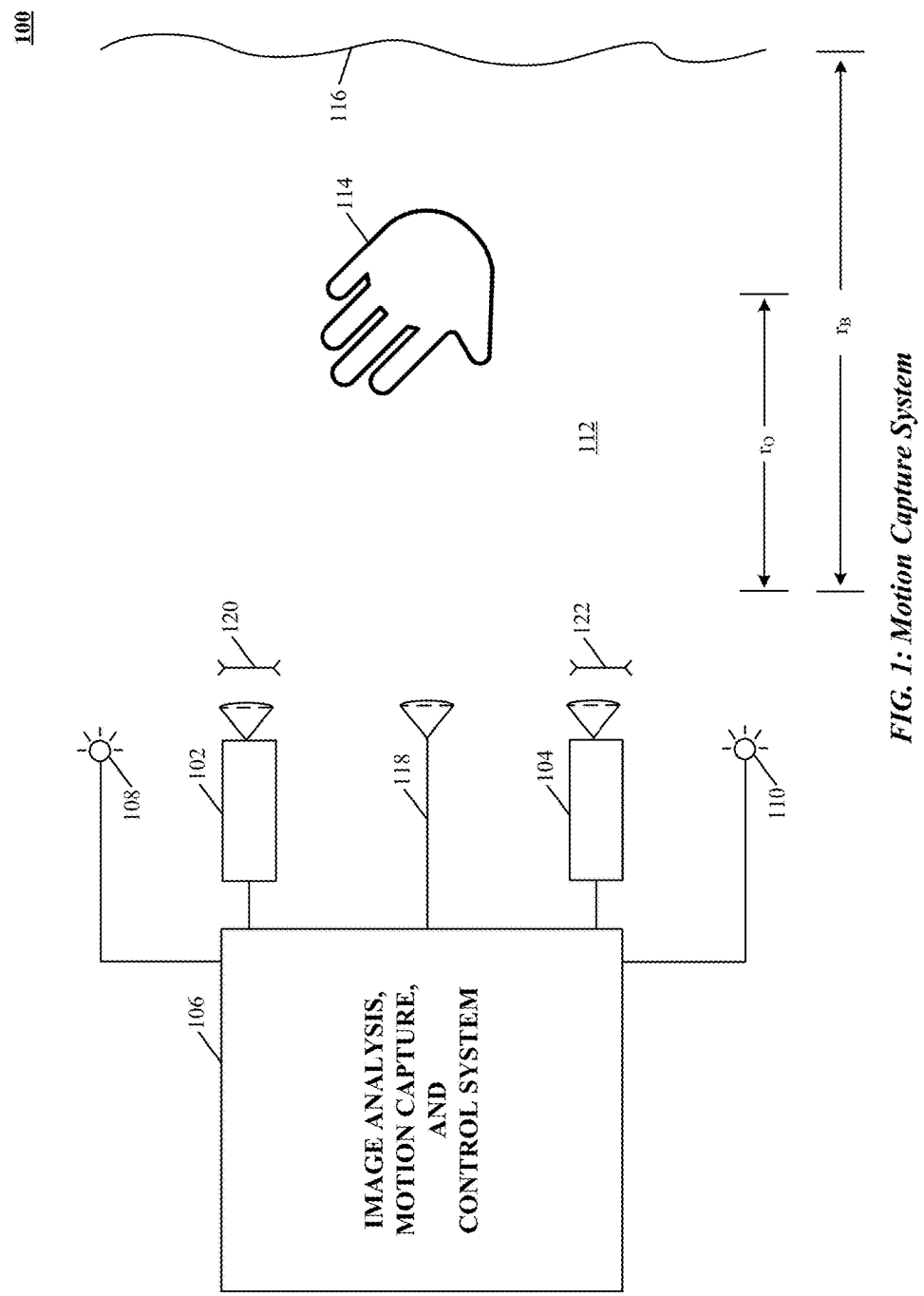
FIG. 1: Motion Capture System

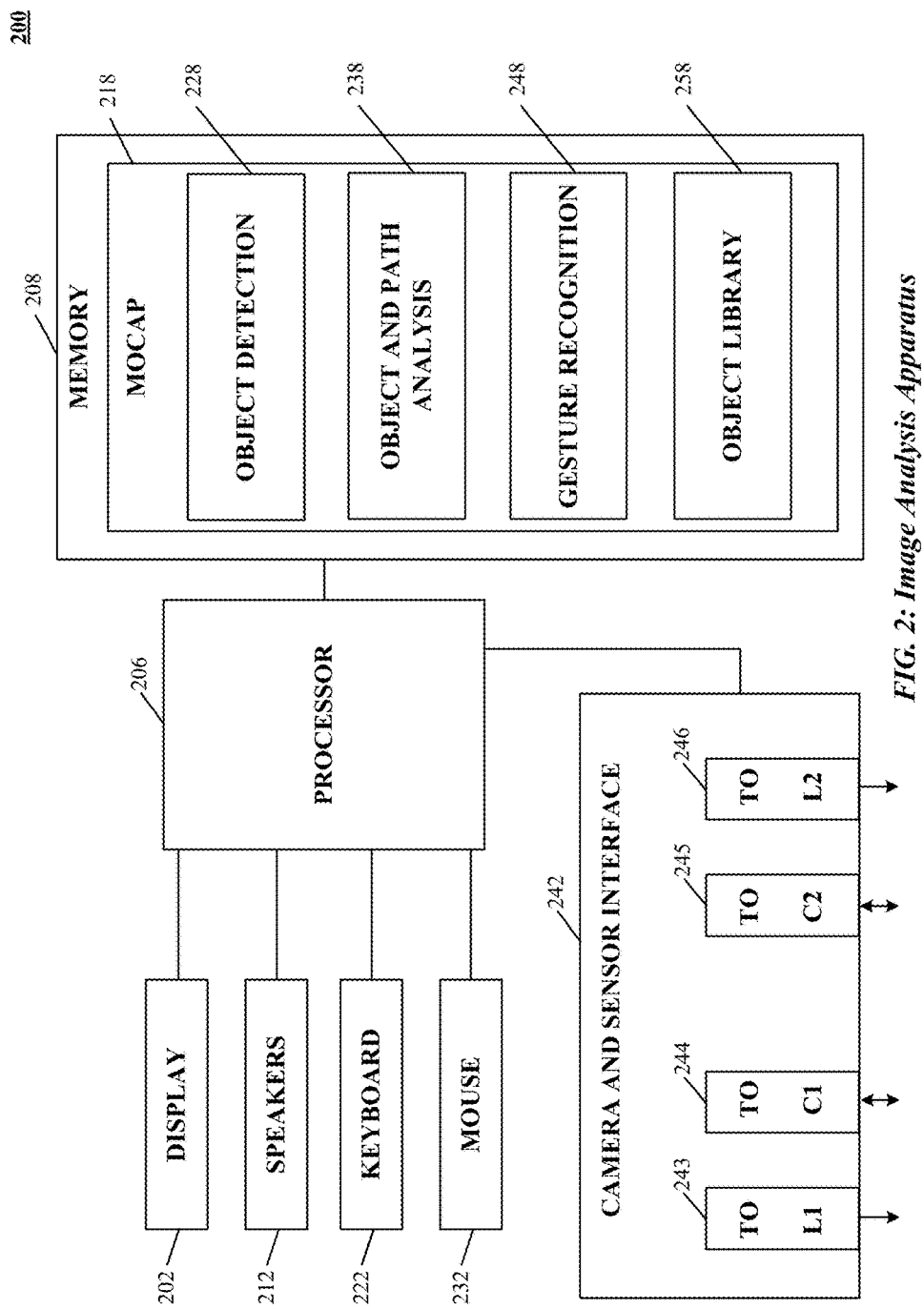
FIG. 2: Image Analysis Apparatus

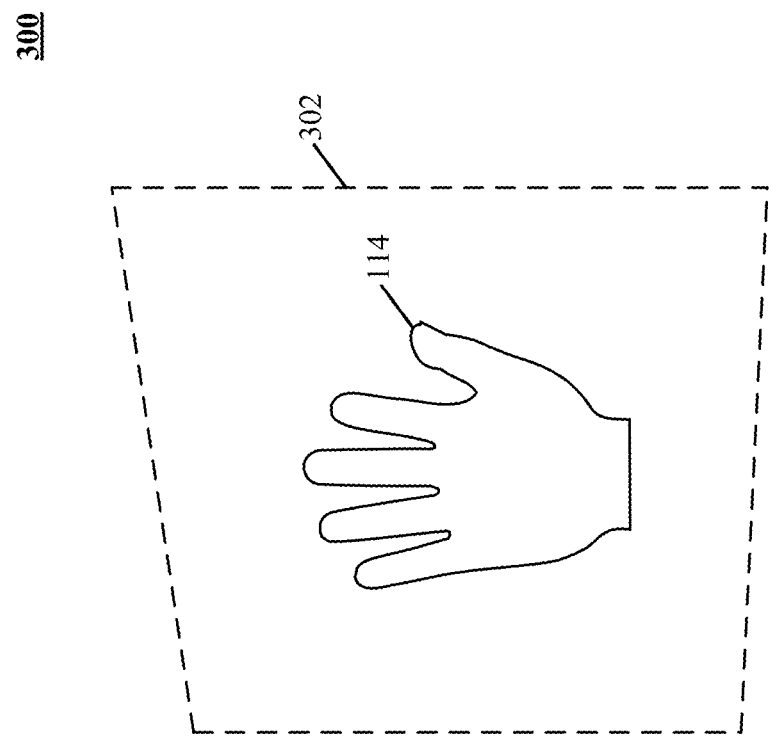
FIG. 3: Control Plane

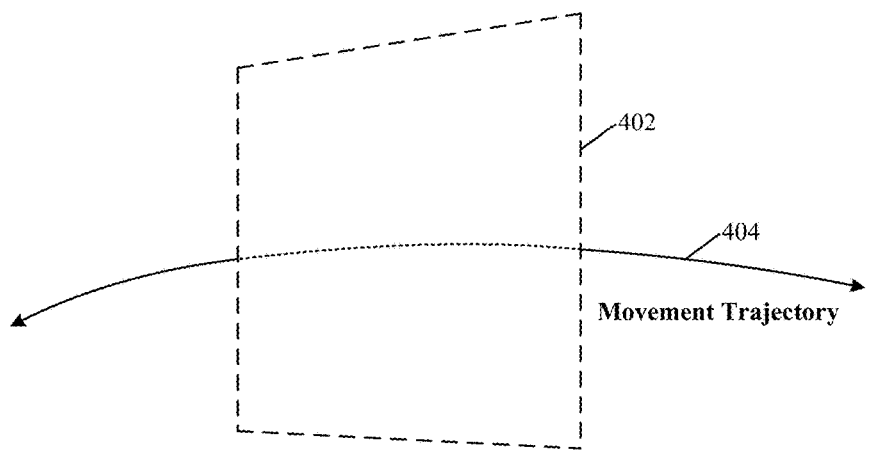
*FIG. 4A: Control Plane Normality*
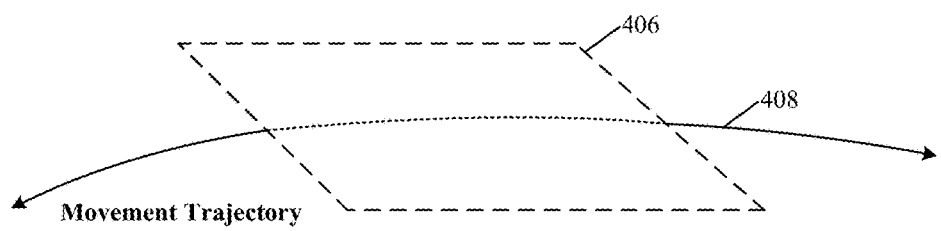
*FIG. 4B: Control Plane Parallelity*

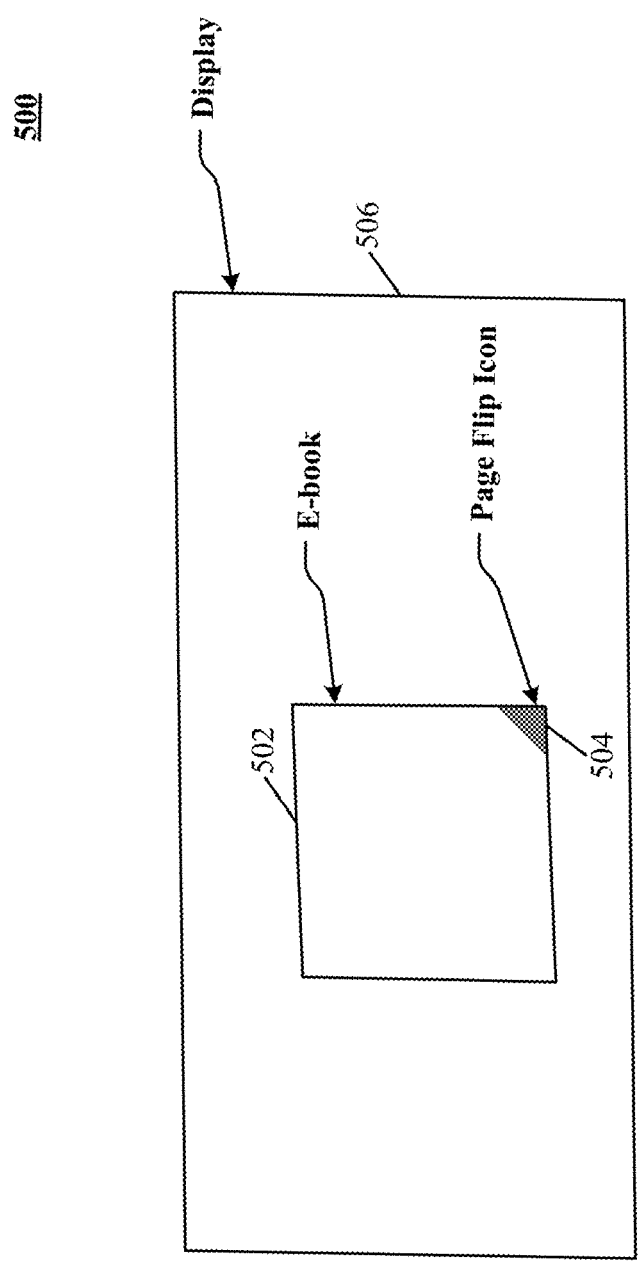
FIG. 5: Double Flip

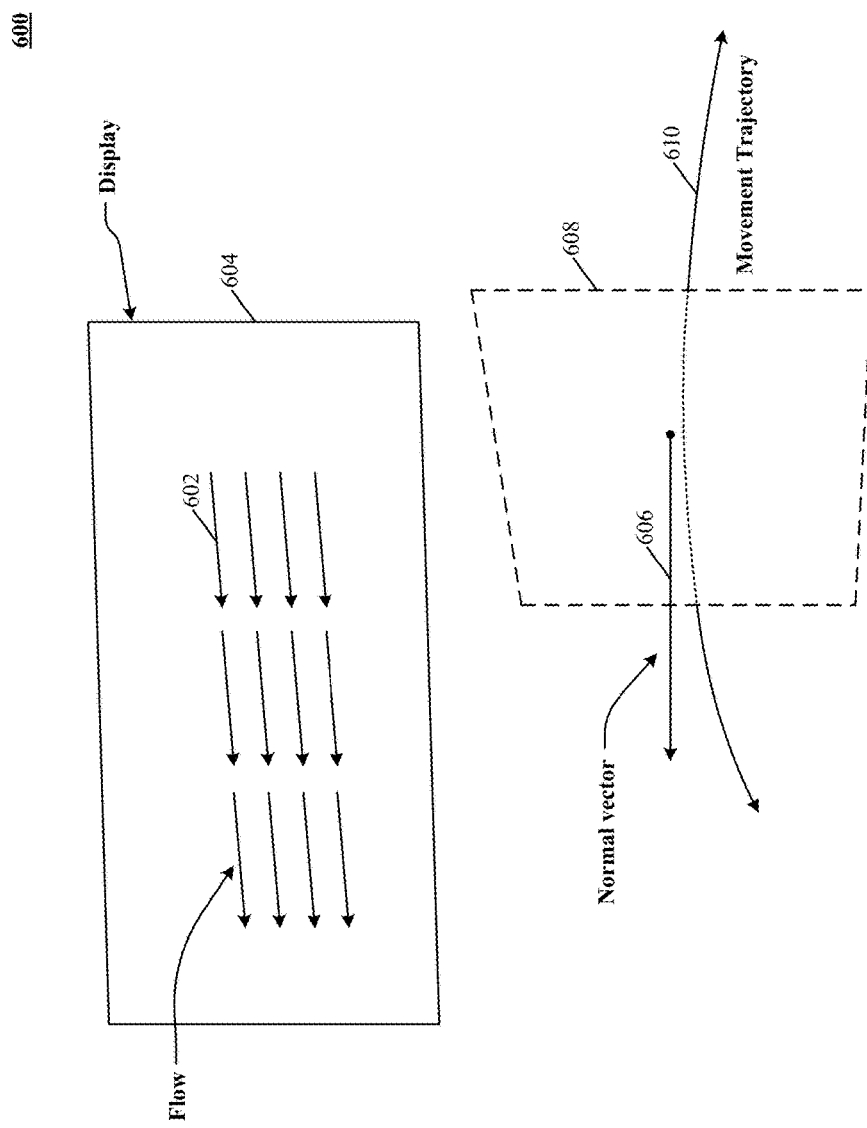
FIG. 6: Display Flow

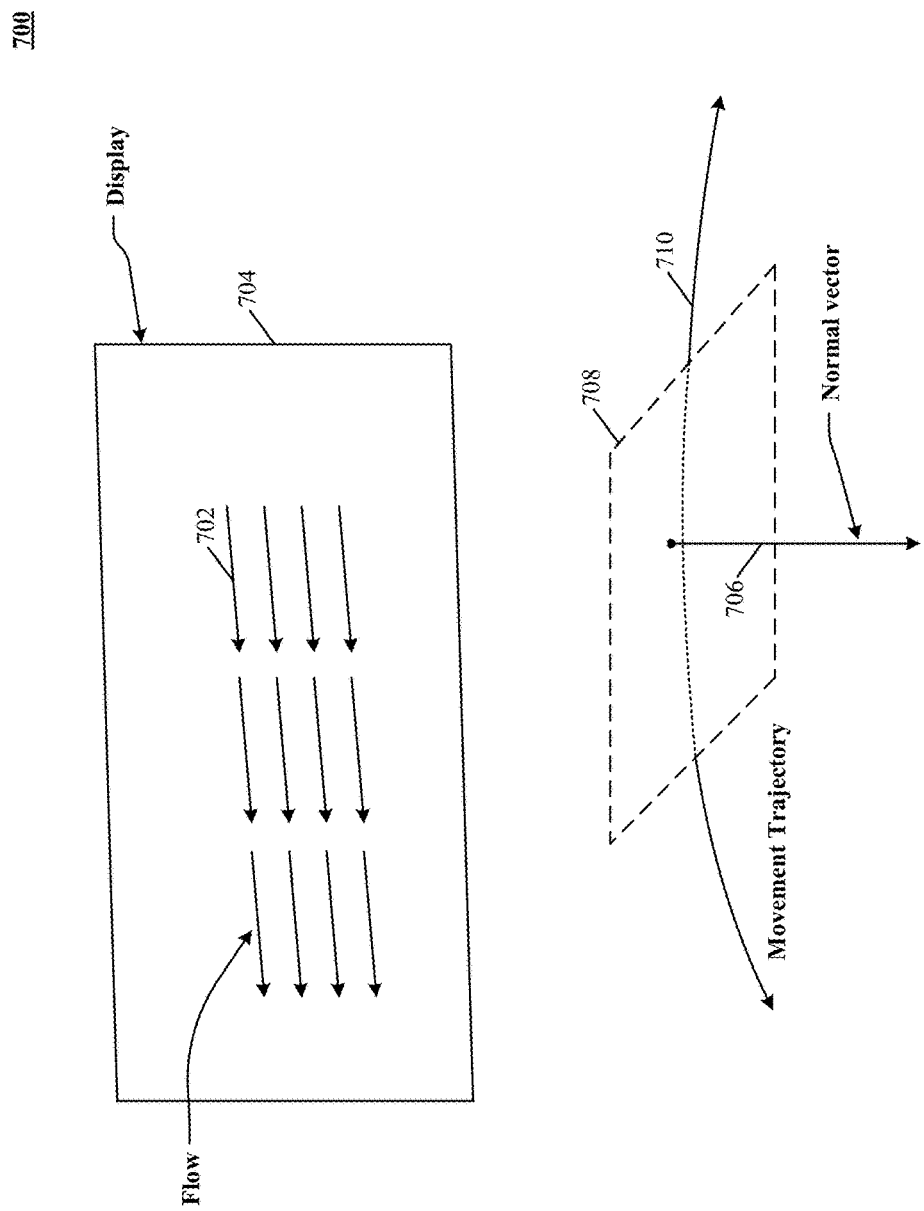
FIG. 7: *Display Flow*

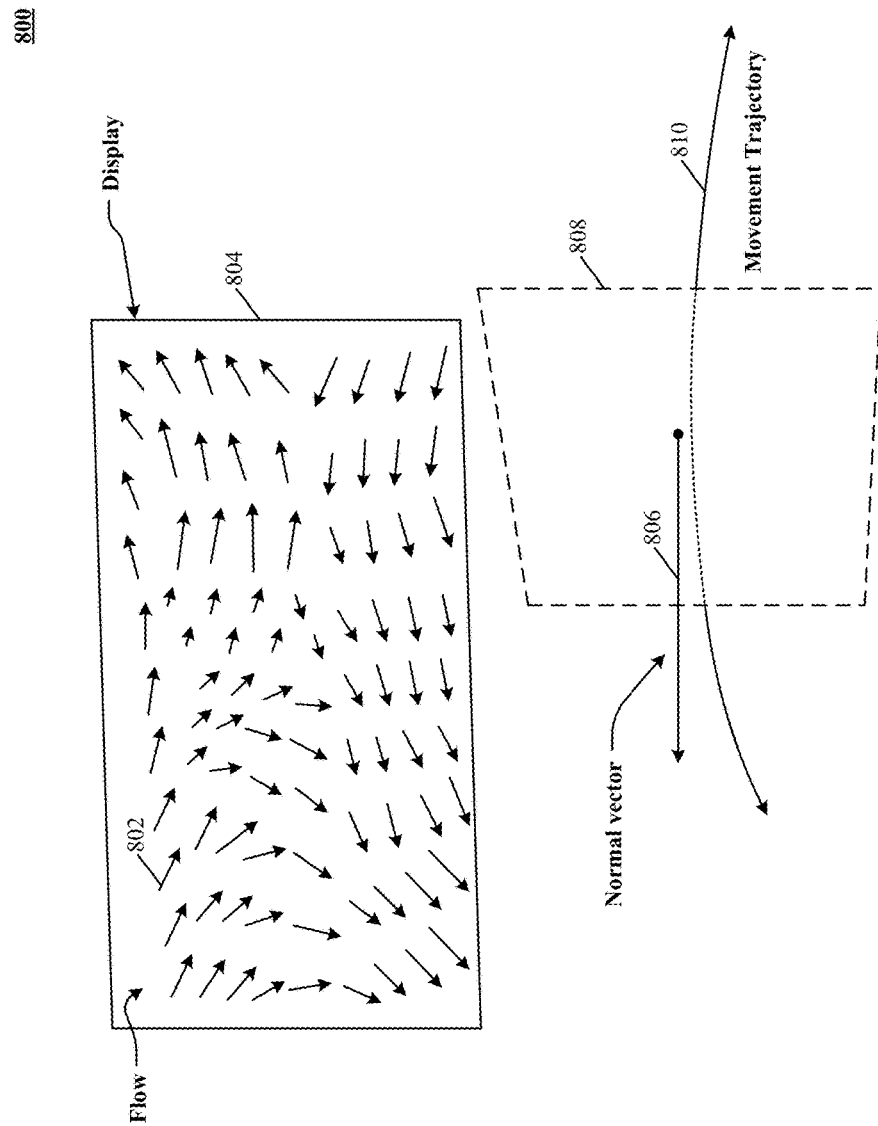
FIG. 8: Display Variable Flow

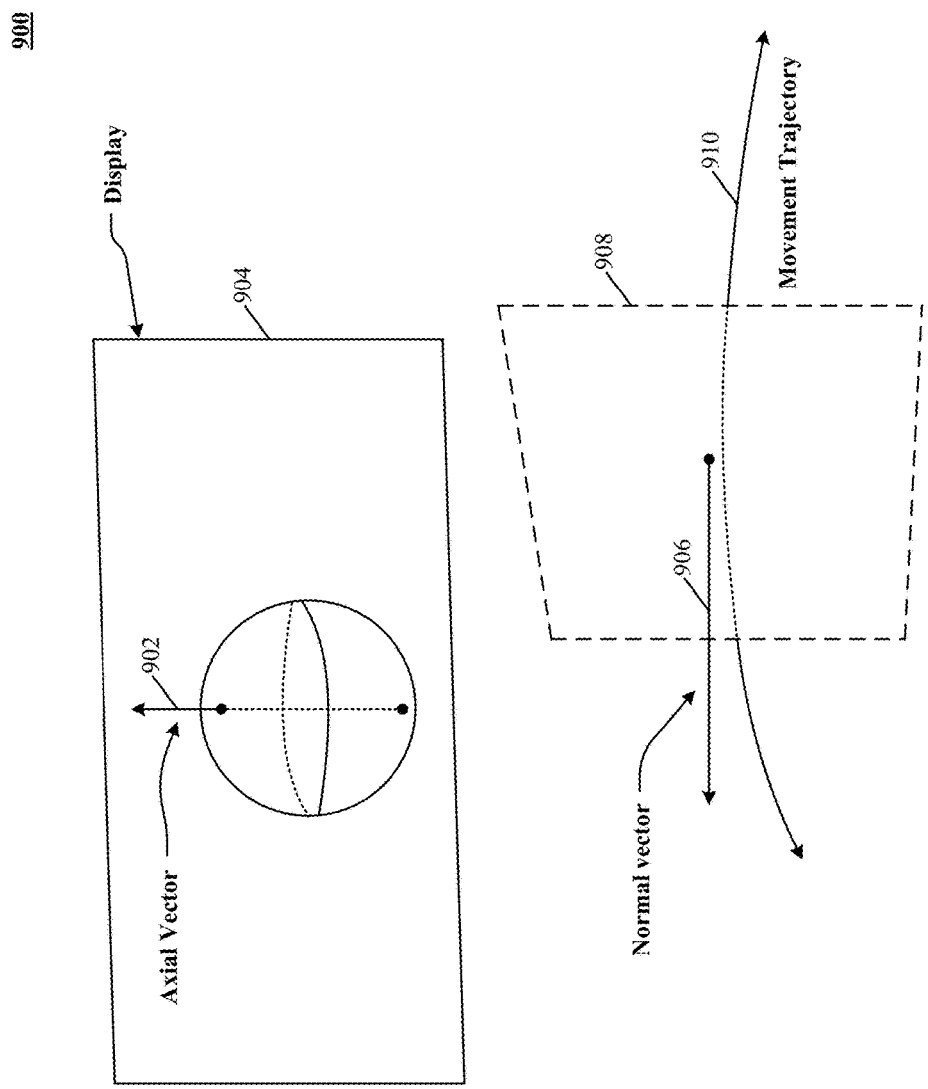
FIG. 9: Sphere Gestural Manipulation

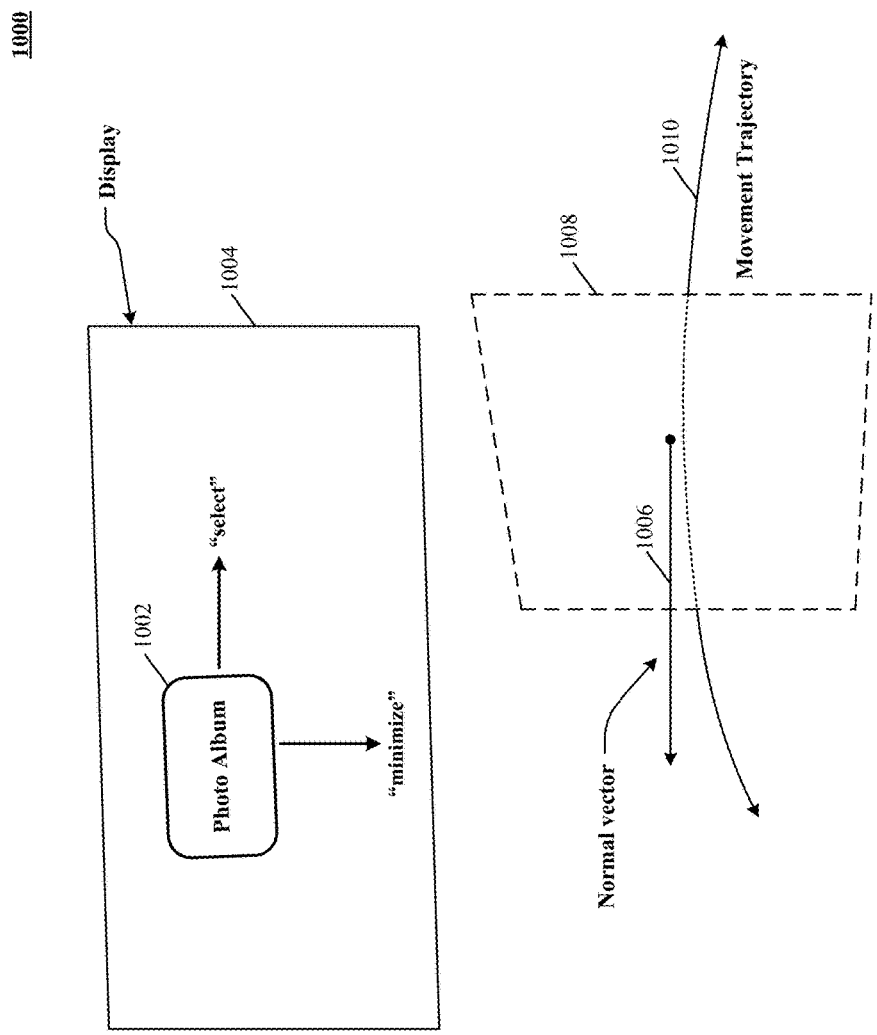
FIG. 10: Icon Gestural Manipulation

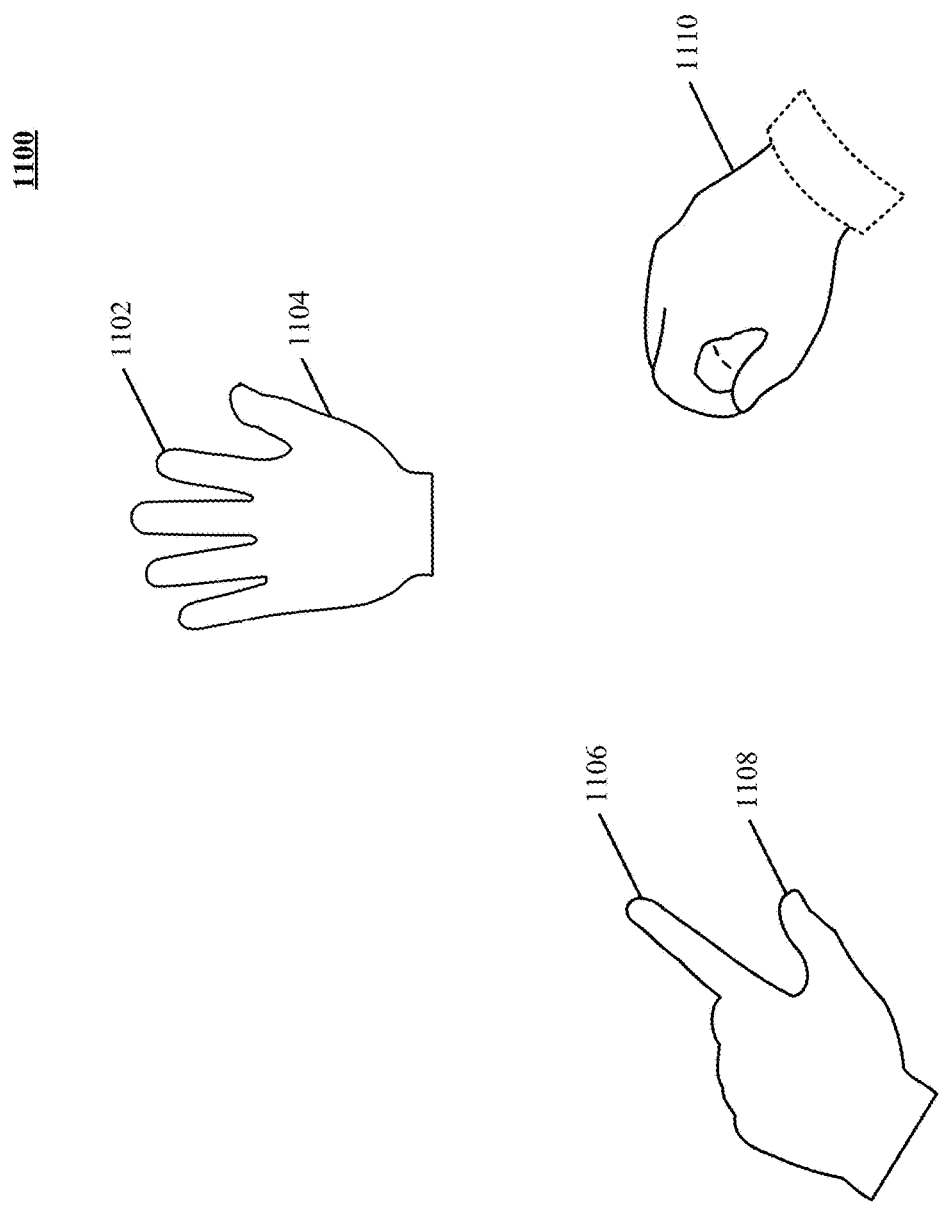
FIG. 11: Control Object and Sub-Object

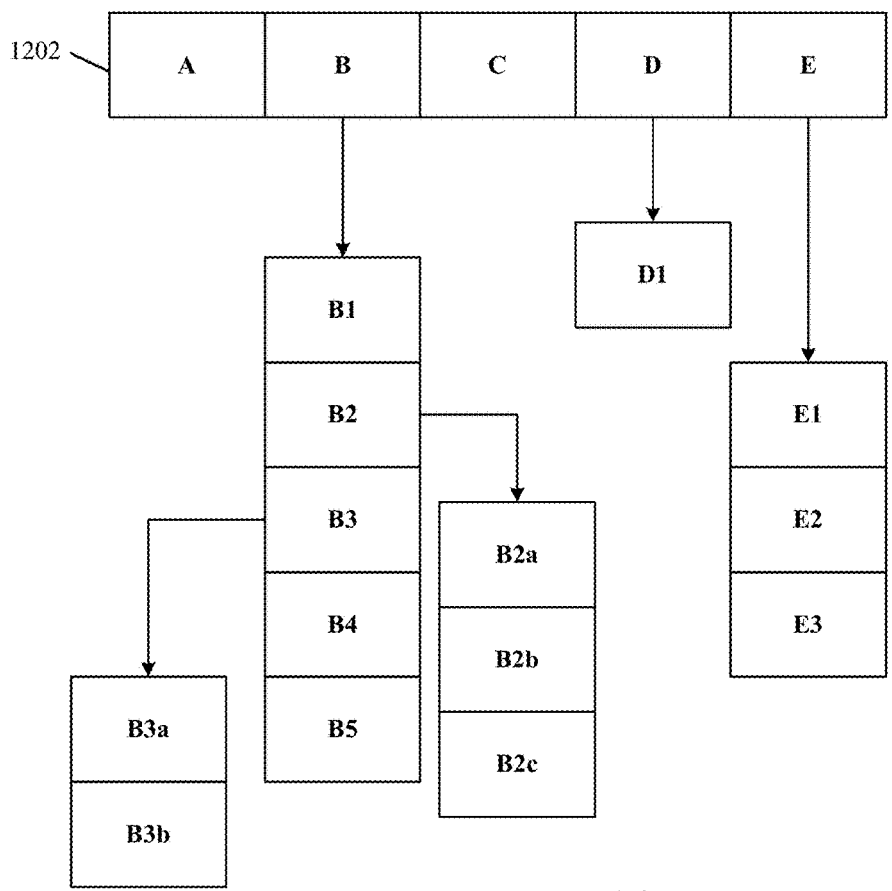
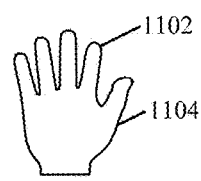
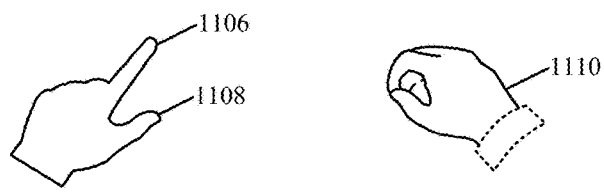
*FIG. 12: Gestural Tree Navigation*

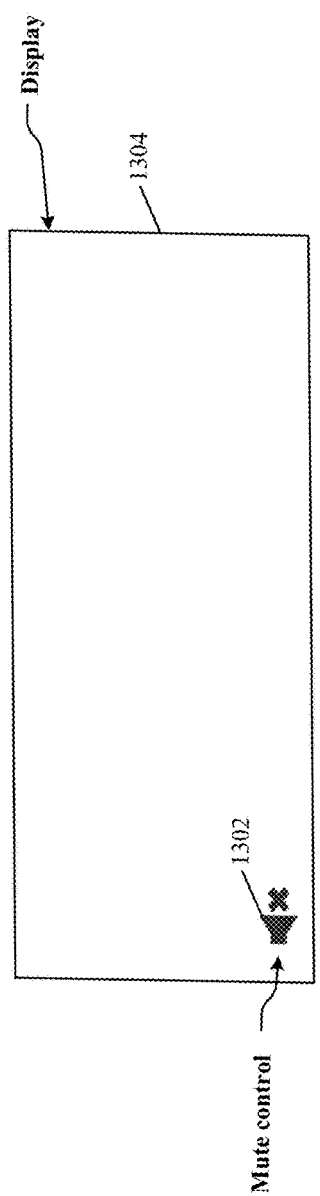
*FIG. 13A: Gestural Mute Control*
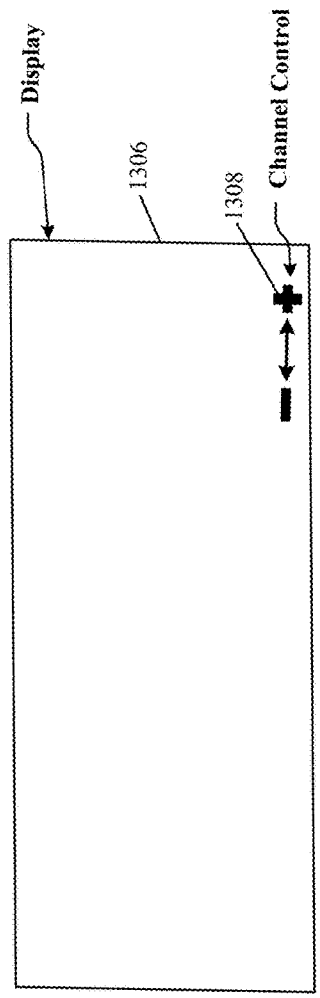
*FIG. 13B: Gestural Channel Control*

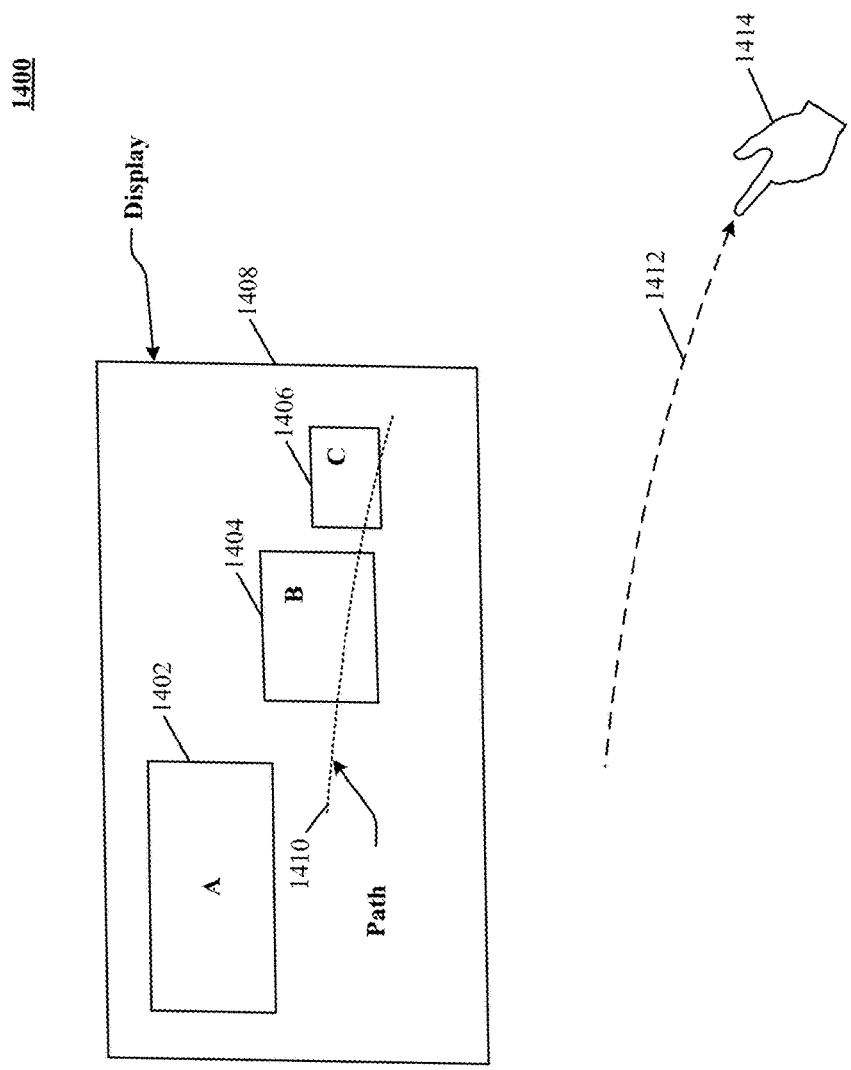
FIG. 14: Gestural Duplication

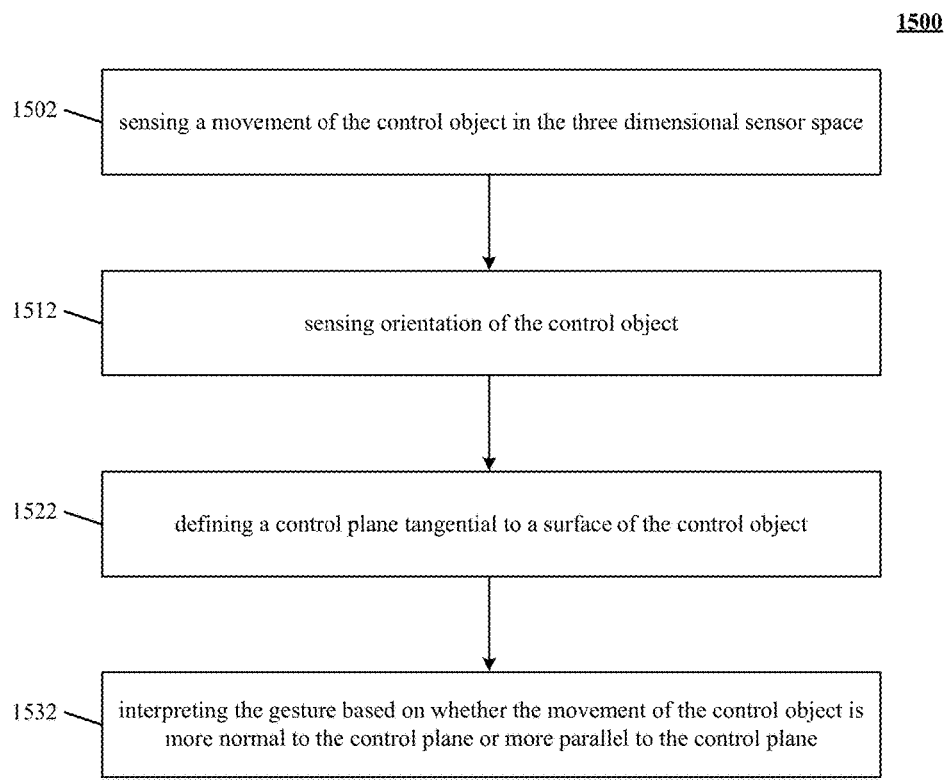
FIG. 15: *Automatically Interpreting a Gesture of a Control Object*

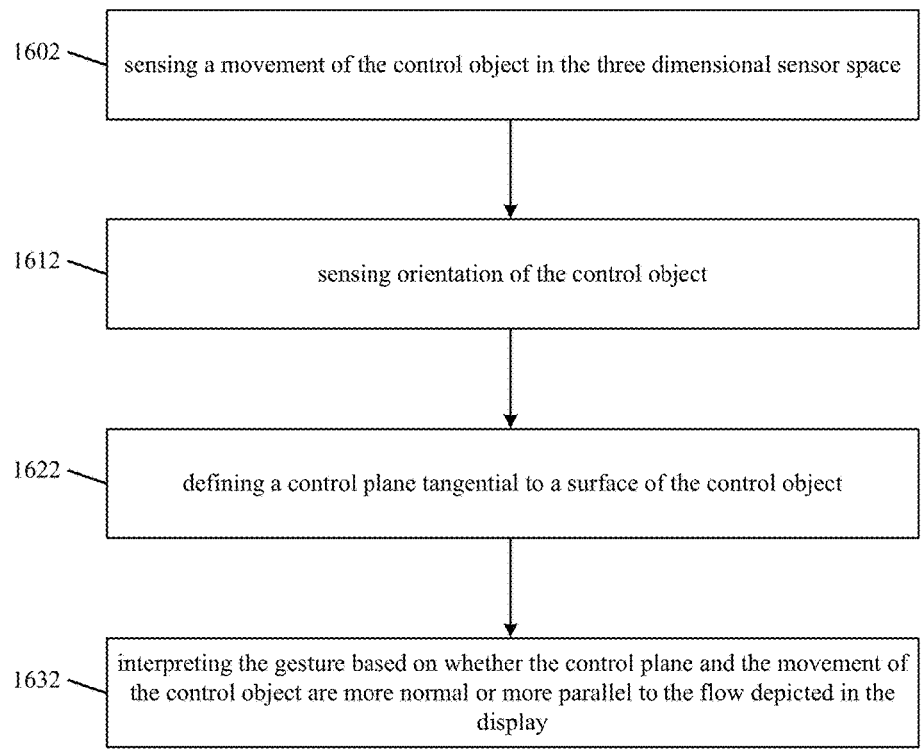
FIG. 16: Automatically Interpreting a Gesture of a Control Object

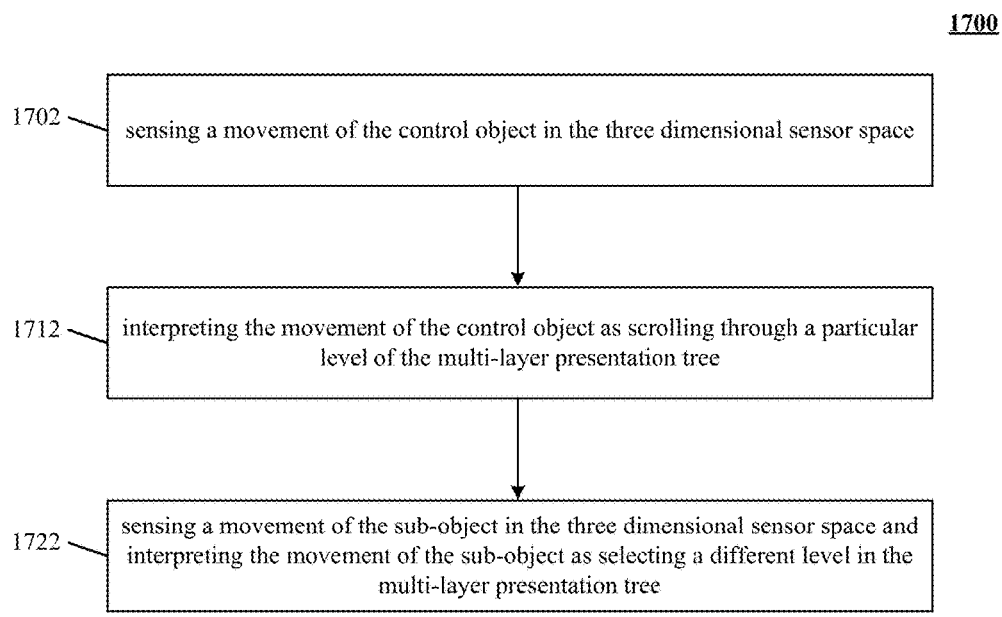
*FIG. 17: Gestural Navigation of a Multi-Layer Presentation Tree*

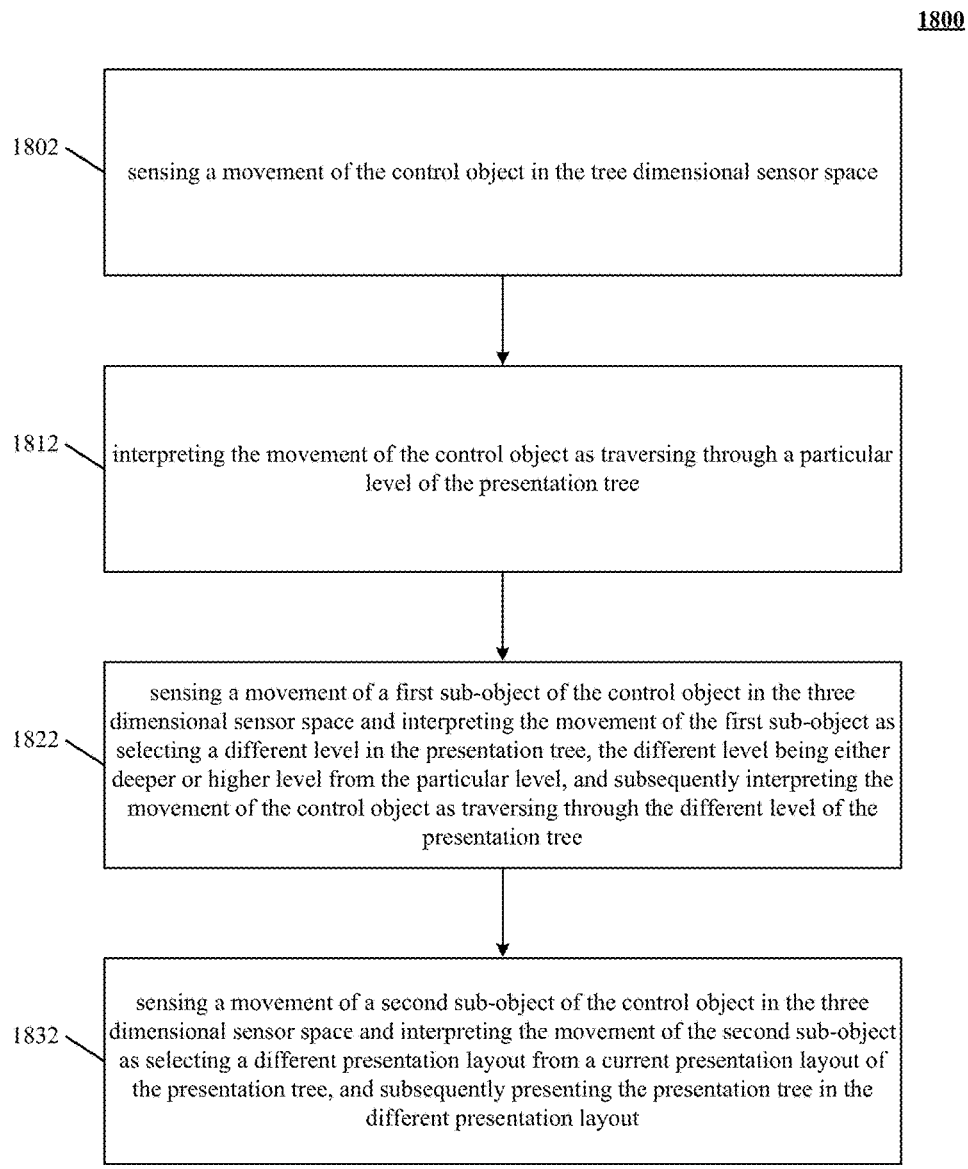
FIG. 18: Gestural Navigation of a Multi-Layer Presentation Tree

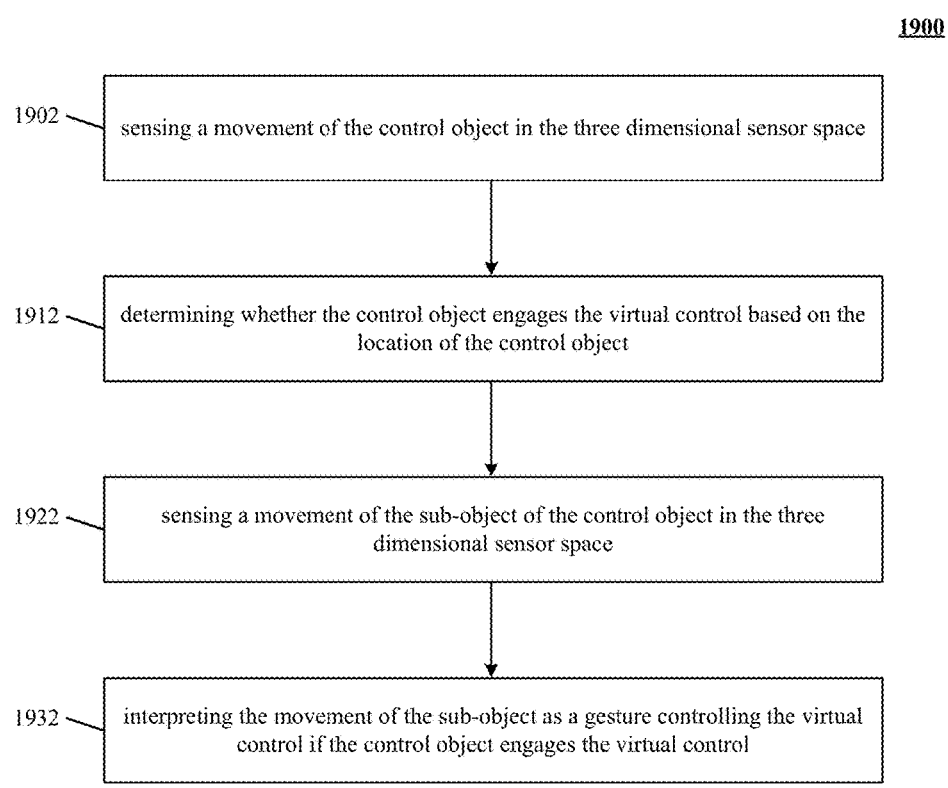
*FIG. 19: Gesturally Controlling a Virtual Control*

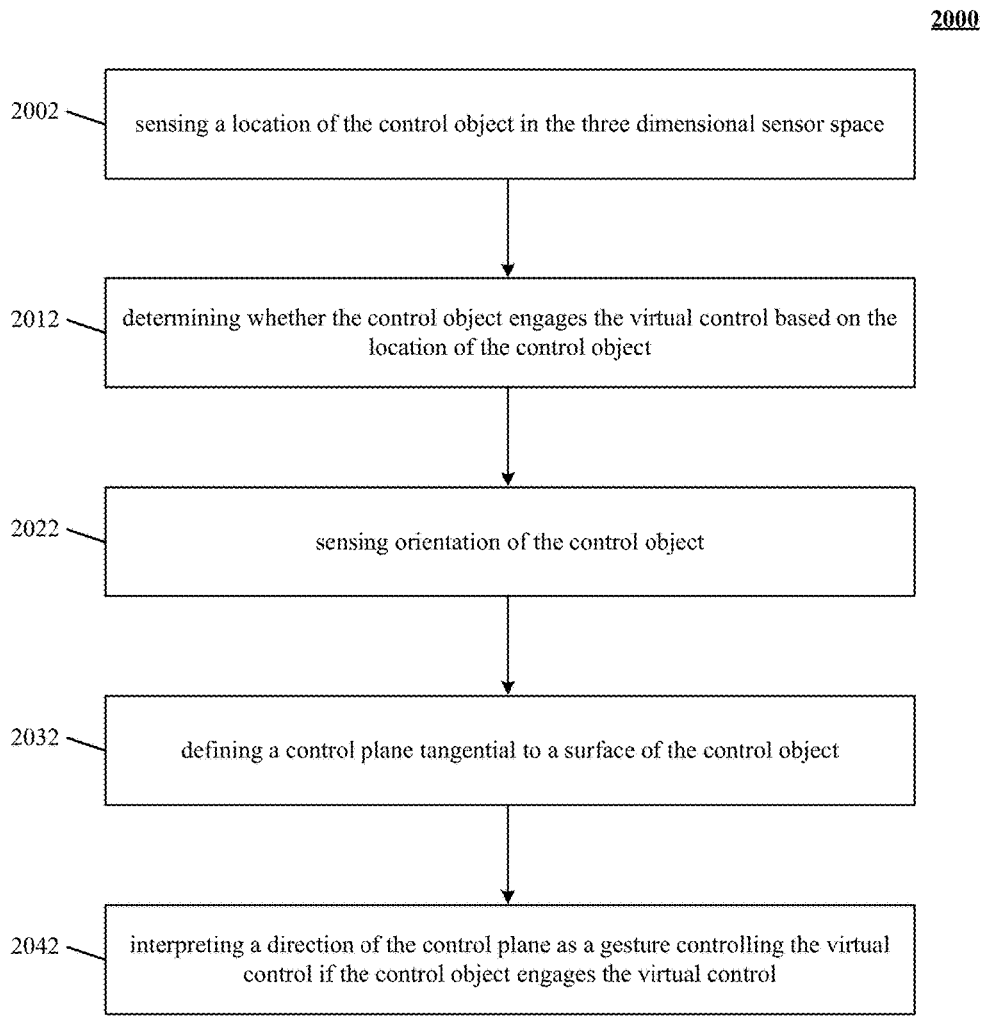
FIG. 20: Gesturally Controlling a Virtual Control

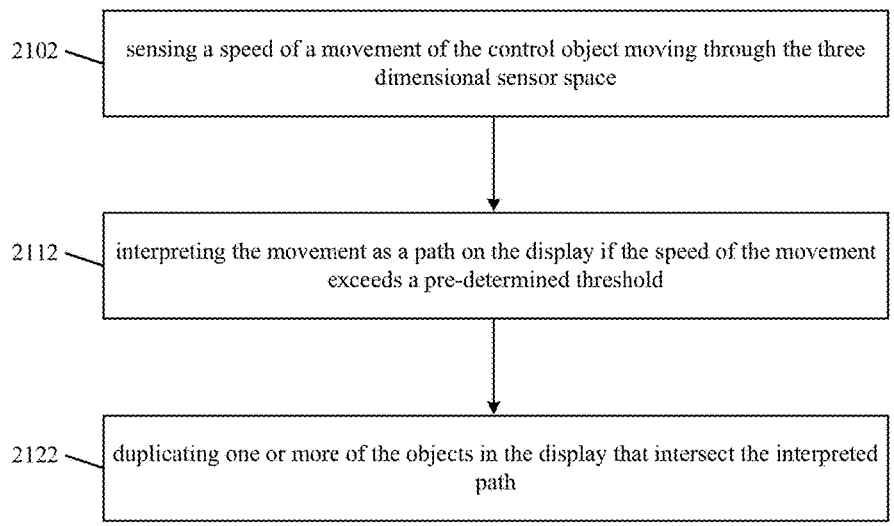
FIG. 21: *Gesturally Duplicating an Object in a Display*

VELOCITY FIELD INTERACTION FOR FREE SPACE GESTURE INTERFACE AND CONTROL

PRIORITY DATA

This application claims the benefit of U.S. Provisional Patent Application No. 61/891,880, entitled, "VELOCITY FIELD INTERACTION FOR FREE SPACE GESTURE INTERFACE AND CONTROL," filed on Oct. 16, 2013. The provisional application is hereby incorporated by reference for all purposes.

INCORPORATIONS

Materials incorporated by reference in this filing include the following:

"INTERACTIVE TRAINING RECOGNITION OF FREE-SPACE GESTURES FOR INTERFACE AND CONTROL," U.S. Prov. App. No. 61/872,538, filed 30 Aug. 2013, "METHODS AND SYSTEMS FOR IDENTIFYING POSITION AND SHAPE OF OBJECTS IN THREE-DIMENSIONAL SPACE," U.S. Prov. App. No. 61/587,554, filed 17 Jan. 2012, "SYSTEMS AND METHODS FOR CAPTURING MOTION IN THREE-DIMENSIONAL SPACE," U.S. Prov. App. No. 61/724,091, filed 8 Nov. 2012, "NON-TACTILE INTERFACE SYSTEMS AND METHODS", U.S. Prov. App. No. 61/816,487, filed 26 Apr. 2013, "DYNAMIC USER INTERACTIONS FOR DISPLAY CONTROL," U.S. Prov. App. No. 61/752,725, filed 15 Jan. 2013, "MOTION CAPTURE USING CROSS-SECTIONS OF AN OBJECT," U.S. application Ser. No. 13/414,485, filed 7 Mar. 2012, and "SYSTEM AND METHODS FOR CAPTURING MOTION IN THREE-DIMENSIONAL SPACE," U.S. application Ser. No. 13/742,953, filed 16 Jan. 2013.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Users interact with a touch-screen user interface of a device with touch gestures. The device detects one or more touch events (e.g., tap, swipe, pinch-in, rotate, etc.) when the user performs a touch gesture on the touch screen using fingertips or other pointing devices. The device interprets the user's detected touch events. Detection and interpretation of a touch gesture can be well defined by the location and movement of the physical contact (or close proximity) between the user's fingertip(s) and the touch screen.

Interpreting a user's gestures in a three dimensional (3D) free space placed in front of a device is challenging as often there is no clear indication whether the user's gesture in the 3D free space engages the device. It is also challenging in determining a particular portion or a particular hierarchical level of a user interface that the user is interacting with using gestures in the 3D free space.

SUMMARY

The technology disclosed relates to automatically interpreting a gesture of a control object in a three dimensional sensor space by sensing a movement of the control object in the three dimensional sensor space, sensing orientation of the control object, defining a control plane tangential to a surface of the control object and interpreting the gesture based on whether the movement of the control object is more normal to the control plane or more parallel to the control plane.

The technology disclosed also relates to automatically interpreting a gesture of a control object in a three dimensional sensor space relative to a flow depicted in a display by sensing a movement of the control object in the three dimensional sensor space, sensing orientation of the control object, defining a control plane tangential to a surface of the control object and interpreting the gesture based on whether the control plane and the movement of the control object are more normal or more parallel to the flow depicted in the display.

The technology disclosed further relates to navigating a multi-layer presentation tree using gestures of a control object in a three dimensional sensor space by distinguishing between the control object and a sub-object of the control object by sensing a movement of the control object in the three dimensional sensor space, interpreting the movement of the control object as scrolling through a particular level of the multi-layer presentation tree, sensing a movement of the sub-object in the three dimensional sensor space and interpreting the movement of the sub-object as selecting a different level in the multi-layer presentation tree and subsequently interpreting the movement of the control object as scrolling through the different level of the multi-layer presentation tree.

The technology disclosed also relates to navigating a multi-layer presentation tree using gestures of a control object in a three dimensional sensor space by distinguishing between the control object and one or more sub-objects of the control object by sensing a movement of the control object in the three dimensional sensor space, interpreting the movement of the control object as traversing through a particular level of the presentation tree, sensing a movement of a first sub-object of the control object in the three dimensional sensor space and interpreting the movement of the first sub-object as selecting a different level in the presentation tree. It further relates to subsequently interpreting the movement of the control object as traversing through the different level of the presentation tree, sensing a movement of a second sub-object of the control object in the three dimensional sensor space, interpreting the movement of the second sub-object as selecting a different presentation layout from a current presentation layout of the presentation tree and subsequently presenting the presentation tree in the different presentation layout.

The technology further relates to automatically determining a control to a virtual control by a control object in a three dimensional sensor space by distinguishing the control object and a sub-object of the control object by sensing a location of the control object in the three dimensional sensor space, determining whether the control object engages the virtual control based on the location of the control object, sensing a movement of the sub-object of the control object in the three dimensional sensor space and interpreting the movement of the sub-object as a gesture controlling the virtual control if the control object engages the virtual control.

The technology disclosed also relates to automatically determining a control to a virtual control by a control object in a three dimensional sensor space by sensing a location of the control object in the three dimensional sensor space, determining whether the control object engages the virtual control based on the location of the control object, sensing orientation of the control object, defining a control plane tangential to a surface of the control object and interpreting a direction of the control plane as a gesture controlling the virtual control if the control object engages the virtual control.

The technology disclosed further relates to automatically interpreting a gesture of a control object in a three dimensional space relative to one or more objects depicted in a display by sensing a speed of a movement of the control object moving through the three dimensional sensor space, interpreting the movement as a path on the display if the speed of the movement exceeds a pre-determined threshold and duplicating one or more of the objects in the display that intersect the interpreted path.

Other aspects and advantages of the present invention can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 illustrates an exemplary motion-capture system in accordance with implementations of the technology disclosed.

FIG. 2 illustrates an exemplary computer system for image processing, analysis, and display in accordance with implementations of the technology disclosed.

FIG. 3 shows definition of a control plane with respect to a control object according to one implementation of the technology disclosed.

FIG. 4A illustrates a control plane that is more normal to a control object's trajectory.

FIG. 4B depicts a control plane that is more parallel to a control object's trajectory.

FIG. 5 is one implementation of gesturally controlling an electronic book.

FIG. 6 illustrates a flow flowing horizontally leftward in a display, and a control plane more parallel to the flow.

FIG. 7 depicts a flow flowing horizontally leftward in a display, and a control plane more normal to the flow.

FIG. 8 illustrates a flow having vectors of various directions and magnitudes at different locations in a display.

FIG. 9 illustrates one implementation of gesturally controlling a sphere in a display.

FIG. 10 shows one implementation of gesturally controlling a photo album icon in a display.

FIG. 11 is one implementation of automatically interpreting gestures of a control object by distinguishing the control object and a sub-object of the control object.

FIG. 12 illustrates one implementation of automatically interpreting gestures of a control object to navigate a multi-layer presentation tree presented across a display.

FIGS. 13A-B depict one implementation of gesturally controlling virtual controls in a display.

FIG. 14 shows one implementation of gesturally duplicating objects in a display.

FIG. 15 is a representative method of automatically interpreting a gesture of a control object in a three dimensional sensor space.

FIG. 16 illustrates a method of automatically interpreting a gesture of a control object in a three dimensional sensor space relative to a flow depicted in a display.

FIG. 17 shows a flowchart of navigating a multi-layer presentation tree using gestures of a control object in a three dimensional sensor space by distinguishing between the control object and a sub-object of the control object.

FIG. 18 depicts a representative method of navigating a multi-layer presentation tree using gestures of a control object in a three dimensional sensor space by distinguishing between the control object and one or more sub-objects of the control object.

FIG. 19 shows a method of automatically determining a control to a virtual control by a control object in a three dimensional sensor space by distinguishing the control object and a sub-object of the control object.

FIG. 20 is a flowchart of automatically determining a control to a virtual control by a control object in a three dimensional sensor space.

FIG. 21 depicts a representative method of automatically interpreting a gesture of a control object in a three dimensional space relative to one or more objects depicted in a display.

DESCRIPTION

A user can interact with a device incorporating a 3D sensor such as described in U.S. Prov. App. No. 61/816,487 and U.S. Prov. App. No. 61/872,538 by using gestures in a 3D sensor space monitored by the 3D sensor. Interacting with the device often requires the control object (e.g., a hand) exiting the 3D sensor space (a "resetting" gesture) to specify a control (or engagement of a control) of the device. The technology disclosed relates to methods for interpreting gestures of a control object in a 3D sensor space, without requiring the control object exiting the 3D sensor space. The method can be implemented by a computing device incorporating a 3D sensor as described in U.S. Prov. App. No. 61/816,487 and U.S. Prov. App. No. 61/872,538. One implementation of underlying technology to which the further technology disclosed can be applied is illustrated in FIG. 1.

Motion-Capture System

Motion-capture systems generally include (i) a camera for acquiring images of an object; (ii) a computer for processing the images to identify and characterize the object; and (iii) a computer display for displaying information related to the identified/characterized object. Referring first to FIG. 1, which illustrates an exemplary motion-capture system 100 including any number of cameras 102, 104 coupled to an image analysis, motion capture, and control system 106 (The system 106 is hereinafter variably referred to as the "image analysis and motion capture system," the "image analysis system," the "motion capture system," "the gesture recognition system," the "control and image-processing system," the "control system," or the "image-processing system," depending on which functionality of the system is being discussed.).

Cameras 102, 104 provide digital image data to the image analysis, motion capture, and control system 106, which analyzes the image data to determine the three-dimensional (3D) position, orientation, and/or motion of the object 114 the field of view of the cameras 102, 104. Cameras 102, 104 can be any type of cameras, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. Further, the term "light" is used generally to connote any electromagnetic radiation, which may or may not be within the visible spectrum, and can be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side. To capture motion of a running person, the volume of interest might have dimensions of tens of meters in order to observe several strides.

Cameras 102, 104 can be oriented in any convenient manner. In one implementation, the optical axes of the cameras 102, 104 are parallel, but this is not required. As described below, each of the 102, 104 can be used to define a "vantage point" from which the object 114 is seen; if the location and view direction associated with each vantage point are known, the locus of points in space that project onto a particular position in the cameras' image plane can be determined. In some implementations, motion capture is reliable only for objects in an area where the fields of view of cameras 102, 104; the cameras 102, 104 can be arranged to provide overlapping fields of view throughout the area where motion of interest is expected to occur.

In some implementations, the illustrated system 100 includes one or more sources 108, 110, which can be disposed to either side of cameras 102, 104, and are controlled by image analysis and motion capture system 106. In one implementation, the sources 108, 110 are light sources. For example, the light sources can be infrared light sources, e.g., infrared light emitting diodes (LEDs), and cameras 102, 104 can be sensitive to infrared light. Use of infrared light can allow the motion-capture system 100 to operate under a broad range of lighting conditions and can avoid various inconveniences or distractions that can be associated with directing visible light into the region where the person is moving. However, a particular wavelength or region of the electromagnetic spectrum can be required. In one implementation, filters 120, 122 are placed in front of cameras 102, 104 to filter out visible light so that only infrared light is registered in the images captured by cameras 102, 104. In another implementation, the sources 108, 110 are sonic sources providing sonic energy appropriate to one or more sonic sensors (not shown in FIG. 1 for clarity sake) used in conjunction with, or instead of, cameras 102, 104. The sonic sources transmit sound waves to the user; with the user either blocking ("sonic shadowing") or altering the sound waves ("sonic deflections") that impinge upon her. Such sonic shadows and/or deflections can also be used to detect the user's gestures and/or provide presence information and/or distance information using ranging techniques. In some implementations, the sound waves are, for example, ultrasound, which are not audible to humans.

It should be stressed that the arrangement shown in FIG. 1 is representative and not limiting. For example, lasers or other light sources can be used instead of LEDs. In implementations that include laser(s), additional optics (e.g., a lens or diffuser) can be employed to widen the laser beam (and make its field of view similar to that of the cameras). Useful arrangements can also include short-angle and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 that includes an entire control object or its portion 114 (in this example, a hand) that can optionally hold a tool or other object of interest. Cameras 102, 104 are oriented toward the region 112 to capture video images of the hand 114. In some implementations, the operation of light sources 108, 110 and cameras 102, 104 is controlled by the image analysis and motion capture system 106, which can be, e.g., a computer system, control logic implemented in hardware and/or software or combinations thereof. Based on the captured images, image analysis and motion capture system 106 determines the position and/or motion of hand 114.

Motion capture can be improved by enhancing contrast between the object of interest 114 and background surfaces like surface 116 visible in an image, for example, by means of controlled lighting directed at the object. For instance, in motion capture system 106 where an object of interest 114, such as a person's hand, is significantly closer to the cameras 102 and 104 than the background surface 116, the falloff of light intensity with distance ($1/r^2$ for point like light sources) can be exploited by positioning a light source (or multiple light sources) near the camera(s) or other image-capture device(s) and shining that light onto the object 114. Source light reflected by the nearby object of interest 114 can be expected to be much brighter than light reflected from more distant background surface 116, and the more distant the background (relative to the object), the more pronounced the effect will be. Accordingly, a threshold cut off on pixel brightness in the captured images can be used to distinguish "object" pixels from "background" pixels. While broadband ambient light sources can be employed, various implementations use light having a confined wavelength range and a camera matched to detect such light; for example, an infrared source light can be used with one or more cameras sensitive to infrared frequencies.

In operation, cameras 102, 104 are oriented toward a region of interest 112 in which an object of interest 114 (in this example, a hand) and one or more background objects 116 can be present. Light sources 108, 110 are arranged to illuminate region 112. In some implementations, one or more of the light sources 108, 110 and one or more of the cameras 102, 104 are disposed below the motion to be detected, e.g., in the case of hand motion, on a table or other surface beneath the spatial region where hand motion occurs. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Further, if the cameras 102, 104 are looking up, there is little likelihood of confusion with background objects (clutter on the user's desk, for example) and other people within the cameras' field of view.

Control and image-processing system 106, which can be, e.g., a computer system, specialized hardware, or combinations thereof, can control the operation of light sources 108, 110 and cameras 102, 104 to capture images of region 112. Based on the captured images, the image-processing system 106 determines the position and/or motion of object 114. For example, in determining the position of object 114, image-analysis system 106 can determine which pixels of various images captured by cameras 102, 104 contain portions of object 114. In some implementations, any pixel in an image can be classified as an "object" pixel or a "background" pixel depending on whether that pixel contains a portion of object 114 or not. With the use of light sources 108, 110, classification of pixels as object or background pixels can be based on the brightness of the pixel. For example, the distance ($r_O$) between an object of interest 114 and cameras 102, 104 is expected to be smaller than the distance ($r_B$) between background object(s) 116 and cameras 102, 104. Because the intensity of light from sources 108, 110 decreases as $1/r^2$, object 114 will be more brightly lit than background 116, and pixels containing portions of object 114 (i.e., object pixels) will be correspondingly brighter than pixels containing portions of background 116 (i.e., background pixels). For example, if $r_B/r_O=2$, then object pixels will be approximately four times brighter than background pixels, assuming object 114 and background 116 are similarly reflective of the light from sources 108, 110, and further assuming that the overall illumination of region 112 (at least within the frequency band captured by cameras 102, 104) is dominated by light sources 108, 110. These conditions generally hold for suitable choices of cameras 102, 104, light sources 108, 110, filters 120, 122, and objects commonly encountered. For example, light sources 108, 110 can be infrared LEDs capable of strongly emitting radiation in a narrow frequency band, and filters 120, 122 can be matched to the frequency band of light sources 108, 110. Thus, although a human hand or body, or a heat source or other object in the background, can emit some infrared radiation, the response of cameras 102, 104 can still be dominated by light originating from sources 108, 110 and reflected by object 114 and/or background 116.

In this arrangement, image-analysis system 106 can quickly and accurately distinguish object pixels from background pixels by applying a brightness threshold to each pixel. For example, pixel brightness in a CMOS sensor or similar device can be measured on a scale from 0.0 (dark) to 1.0 (fully saturated), with some number of gradations in between depending on the sensor design. The brightness encoded by the camera pixels scales standardly (linearly) with the luminance of the object, typically due to the deposited charge or diode voltages. In some implementations, light sources 108, 110 are bright enough that reflected light from an object at distance $r_O$ produces a brightness level of 1.0 while an object at distance $r_B=2r_O$ produces a brightness level of 0.25. Object pixels can thus be readily distinguished from background pixels based on brightness. Further, edges of the object can also be readily detected based on differences in brightness between adjacent pixels, allowing the position of the object within each image to be determined. Correlating object positions between images from cameras 102, 104 allows image-analysis system 106 to determine the location in 3D space of object 114, and analyzing sequences of images allows image-analysis system 106 to reconstruct 3D motion of object 114 using motion algorithms.

In accordance with various implementations of the technology disclosed, the cameras 102, 104 (and typically also the associated image-analysis functionality of control and image-processing system 106) are operated in a low-power mode until an object of interest 114 is detected in the region of interest 112. For purposes of detecting the entrance of an object of interest 114 into this region, the system 100 further includes one or more light sensors 118 (e.g., a CCD or CMOS sensor) and/or an associated imaging optic (e.g., a lens) that monitor the brightness in the region of interest 112 and detect any change in brightness. For example, a single light sensor including, e.g., a photodiode that provides an output voltage indicative of (and over a large range proportional to) a measured light intensity can be disposed between the two cameras 102, 104 and oriented toward the region of interest 112. The one or more sensors 118 continuously measure one or more environmental illumination parameters such as the brightness of light received from the environment. Under static conditions—which implies the absence of any motion in the region of interest 112—the brightness will be constant. If an object enters the region of interest 112, however, the brightness can abruptly change. For example, a person walking in front of the sensor(s) 118 can block light coming from an opposing end of the room, resulting in a sudden decrease in brightness. In other situations, the person can reflect light from a light source in the room onto the sensor, resulting in a sudden increase in measured brightness.

The aperture of the sensor(s) 118 can be sized such that its (or their collective) field of view overlaps with that of the cameras 102, 104. In some implementations, the field of view of the sensor(s) 118 is substantially co-existent with that of the cameras 102, 104 such that substantially all objects entering the camera field of view are detected. In other implementations, the sensor field of view encompasses and exceeds that of the cameras. This enables the sensor(s) 118 to provide an early warning if an object of interest approaches the camera field of view. In yet other implementations, the sensor(s) capture(s) light from only a portion of the camera field of view, such as a smaller area of interest located in the center of the camera field of view.

The control and image-processing system 106 monitors the output of the sensor(s) 118, and if the measured brightness changes by a set amount (e.g., by 10% or a certain number of candela), it recognizes the presence of an object of interest in the region of interest 112. The threshold change can be set based on the geometric configuration of the region of interest and the motion-capture system, the general lighting conditions in the area, the sensor noise level, and the expected size, proximity, and reflectivity of the object of interest so as to minimize both false positives and false negatives. In some implementations, suitable settings are determined empirically, e.g., by having a person repeatedly walk into and out of the region of interest 112 and tracking the sensor output to establish a minimum change in brightness associated with the person's entrance into and exit from the region of interest 112. Of course, theoretical and empirical threshold-setting methods can also be used in conjunction. For example, a range of thresholds can be determined based on theoretical considerations (e.g., by physical modelling, which can include ray tracing, noise estimation, etc.), and the threshold thereafter fine-tuned within that range based on experimental observations.

In implementations where the area of interest 112 is illuminated, the sensor(s) 118 will generally, in the absence of an object in this area, only measure scattered light amounting to a small fraction of the illumination light. Once an object enters the illuminated area, however, this object can reflect substantial portions of the light toward the sensor(s) 118, causing an increase in the measured brightness. In some implementations, the sensor(s) 118 is (or are) used in conjunction with the light sources 108, 110 to deliberately measure changes in one or more environmental illumination parameters such as the reflectivity of the environment within the wavelength range of the light sources. The light sources can blink, and a brightness differential be measured between dark and light periods of the blinking cycle. If no object is present in the illuminated region, this yields a baseline reflectivity of the environment. Once an object is in the area of interest 112, the brightness differential will increase substantially, indicating increased reflectivity. (Typically, the signal measured during dark periods of the blinking cycle, if any, will be largely unaffected, whereas the reflection signal measured during the light period will experience a significant boost.) Accordingly, the control system 106 monitoring the output of the sensor(s) 118 can detect an object in the region of interest 112 based on a change in one or more environmental illumination parameters such as environmental reflectivity that exceeds a predetermined threshold (e.g., by 10% or some other relative or absolute amount). As with changes in brightness, the threshold change can be set theoretically based on the configuration of the image-capture system and the monitored space as well as the expected objects of interest, and/or experimentally based on observed changes in reflectivity.

Computer System

FIG. 2 is a simplified block diagram of a computer system 200, implementing all or portions of image analysis and motion capture system 106 according to an implementation of the technology disclosed. Image analysis and motion capture system 106 can include or consist of any device or device component that is capable of capturing and processing image data. In some implementations, computer system 200 includes a processor 206, memory 208, a sensor interface 242, a display 202 (or other presentation mechanism(s), e.g. holographic projection systems, wearable googles or other head mounted displays (HMDs), heads up displays (HUDs), other visual presentation mechanisms or combinations thereof, speakers 212, a keyboard 222, and a mouse 232. Memory 208 can be used to store instructions to be executed by processor 206 as well as input and/or output data associated with execution of the instructions. In particular, memory 208 contains instructions, conceptually illustrated as a group of modules described in greater detail below, that control the operation of processor 206 and its interaction with the other hardware components. An operating system directs the execution of low-level, basic system functions such as memory allocation, file management and operation of mass storage devices. The operating system can be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION operating system, iOS, Android or other mobile operating systems, or another operating system platform.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid physical arrangement RAM, solid physical arrangement ROM, and the like. The storage media are typically connected to the system bus through a removable or non-removable memory interface.

According to some implementations, cameras 102, 104 and/or light sources 108, 110 can connect to the computer 200 via a universal serial bus (USB), FireWire, or other cable, or wirelessly via Bluetooth, Wi-Fi, etc. The computer 200 can include a camera interface 242, implemented in hardware (e.g., as part of a USB port) and/or software (e.g., executed by processor 206), that enables communication with the cameras 102, 104 and/or light sources 108, 110. The camera interface 242 can include one or more data ports and associated image buffers for receiving the image frames from the cameras 102, 104; hardware and/or software signal processors to modify the image data (e.g., to reduce noise or reformat data) prior to providing it as input to a motion-capture or other image-processing program; and/or control signal ports for transmit signals to the cameras 102, 104, e.g., to activate or deactivate the cameras, to control camera settings (frame rate, image quality, sensitivity, etc.), or the like.

Processor 206 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Camera and sensor interface 242 can include hardware and/or software that enables communication between computer system 200 and cameras such as cameras 102, 104 shown in FIG. 1, as well as associated light sources such as light sources 108, 110 of FIG. 1. Thus, for example, camera and sensor interface 242 can include one or more data ports 244, 245 to which cameras can be connected, as well as hardware and/or software signal processors to modify data signals received from the cameras (e.g., to reduce noise or reformat data) prior to providing the signals as inputs to a motion-capture ("mocap") program 218 executing on processor 206. In some implementations, camera and sensor interface 242 can also transmit signals to the cameras, e.g., to activate or deactivate the cameras, to control camera settings (frame rate, image quality, sensitivity, etc.), or the like. Such signals can be transmitted, e.g., in response to control signals from processor 206, which can in turn be generated in response to user input or other detected events.

Camera and sensor interface 242 can also include controllers 243, 246, to which light sources (e.g., light sources 108, 110) can be connected. In some implementations, controllers 243, 246 provide operating current to the light sources, e.g., in response to instructions from processor 206 executing mocap program 218. In other implementations, the light sources can draw operating current from an external power supply, and controllers 243, 246 can generate control signals for the light sources, e.g., instructing the light sources to be turned on or off or changing the brightness. In some implementations, a single controller can be used to control multiple light sources.

Instructions defining mocap program 218 are stored in memory 208, and these instructions, when executed, perform motion-capture analysis on images supplied from cameras connected to sensor interface 242. In one implementation, mocap program 218 includes various modules, such as an object detection module 228, an image and/or object and path analysis module 238, and gesture-recognition module 248. Object detection module 228 can analyze images (e.g., images captured via sensor interface 242) to detect edges and/or features of an object therein and/or other information about the object's location. Object and path analysis module 238 can analyze the object information provided by object detection module 228 to determine the 3D position and/or motion of the object (e.g., a user's hand). Examples of operations that can be implemented in code modules of mocap program 218 are described below.

The memory 208 can further store input and/or output data associated with execution of the instructions (including, e.g., input and output image data) as well as additional information used by the various software applications. Memory 208 can store object library 258 that can include canonical models of various objects of interest. In some implementations, an object being modeled can be identified by matching its shape to a model in object library 258.

Display 202, speakers 212, keyboard 222, and mouse 232 can be used to facilitate user interaction with computer system 200. In some implementations, results of motion capture using sensor interface 242 and mocap program 218 can be interpreted as user input. For example, a user can perform hand gestures that are analyzed using mocap program 218, and the results of this analysis can be interpreted as an instruction to some other program executing on processor 206 (e.g., a web browser, word processor, or other application). Thus, by way of illustration, a user might use upward or downward swiping gestures to "scroll" a webpage currently displayed on display 202, to use rotating gestures to increase or decrease the volume of audio output from speakers 212, and so on.

It will be appreciated that computer system 200 is illustrative and that variations and modifications are possible. Computer systems can be implemented in a variety of form factors, including server systems, desktop systems, laptop systems, tablets, smart phones or personal digital assistants, wearable devices, e.g., goggles, head mounted displays (HMDs), wrist computers, heads up displays (HUDs) for vehicles, and so on. A particular implementation can include other functionality not described herein, e.g., wired and/or wireless network interfaces, media playing and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

In another example, in some implementations, the cameras 102, 104 are connected to or integrated with a special-purpose processing unit that, in turn, communicates with a general-purpose computer, e.g., via direct memory access ("DMA"). The processing unit can include one or more image buffers for storing the image data read out from the camera sensors, a GPU or other processor and associated memory implementing at least part of the motion-capture algorithm, and a DMA controller. The processing unit can provide processed images or other data derived from the camera images to the computer for further processing. In some implementations, the processing unit sends display control signals generated based on the captured motion (e.g., of a user's hand) to the computer, and the computer uses these control signals to adjust the on-screen display of documents and images that are otherwise unrelated to the camera images (e.g., text documents or maps) by, for example, shifting or rotating the images.

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

With reference to FIGS. 1 and 2, the user performs a gesture that is captured by the cameras 102, 104 as a series of temporally sequential images. In other implementations, cameras 102, 104 can capture any observable pose or portion of a user. For instance, if a user walks into the field of view near the cameras 102, 104, cameras 102, 104 can capture not only the whole body of the user, but the positions of arms and legs relative to the person's core or trunk. These are analyzed by the mocap 218, which provides input to an electronic device, allowing a user to remotely control the electronic device and/or manipulate virtual objects, such as prototypes/models, blocks, spheres, or other shapes, buttons, levers, or other controls, in a virtual environment displayed on display 202. The user can perform the gesture using any part of her body, such as a finger, a hand, or an arm. As part of gesture recognition or independently, the image analysis and motion capture system 106 can determine the shapes and positions of the user's hand in 3D space and in real time; see, e.g., U.S. Ser. Nos. 61/587,554, 13/414,485, 61/724,091, and 13/724,357 filed on Jan. 17, 2012, Mar. 7, 2012, Nov. 8, 2012, and Dec. 21, 2012 respectively, the entire disclosures of which are hereby incorporated by reference. As a result, the image analysis and motion capture system processor 206 may not only recognize gestures for purposes of providing input to the electronic device, but can also capture the position and shape of the user's hand in consecutive video images in order to characterize the hand gesture in 3D space and reproduce it on the display screen 202.

In one implementation, the mocap 218 compares the detected gesture to a library of gestures electronically stored as records in a database, which is implemented in the image analysis and motion capture system 106, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently. Typically, the trajectory of a sensed gesture is mathematically compared against the stored trajectories to find a best match, and the gesture is recognized as corresponding to the located database entry only if the degree of match exceeds a threshold. The vector can be scaled so that, for example, large and small arcs traced by a user's hand will be recognized as the same gesture (i.e., corresponding to the same database record) but the gesture recognition module will return both the identity and a value, reflecting the scaling, for the gesture. The scale can correspond to an actual gesture distance traversed in performance of the gesture, or can be normalized to some canonical distance.

In various implementations, the motion captured in a series of camera images is used to compute a corresponding series of output images for presentation on the display 202. For example, camera images of a moving hand can be translated by the processor 206 into a wire-frame or other graphical representations of motion of the hand. In any case, the output images can be stored in the form of pixel data in a frame buffer, which can, but need not be, implemented, in main memory 208. A video display controller reads out the frame buffer to generate a data stream and associated control signals to output the images to the display 202. The video display controller can be provided along with the processor 206 and memory 208 on-board the motherboard of the computer 200, and can be integrated with the processor 206 or implemented as a co-processor that manipulates a separate video memory.

In some implementations, the computer 200 is equipped with a separate graphics or video card that aids with generating the feed of output images for the display 202. The video card generally includes a graphical processing unit ("GPU") and video memory, and is useful, in particular, for complex and computationally expensive image processing and rendering. The graphics card can implement the frame buffer and the functionality of the video display controller (and the on-board video display controller can be disabled). In general, the image-processing and motion-capture functionality of the system 200 can be distributed between the GPU and the main processor 206.

Free Space Gesture Interface with Orientation of a Control Object

FIG. 3 shows definition 300 of a control plane 302 with respect to a control object 114 according to one implementation of the technology disclosed. Applying the technology disclosed, the computing device automatically interprets a gesture of a control object 114 in a 3D sensor space by discerning a control plane 302 of the control object 114, according to one implementation. The computing device first senses a control object such as a user's hand 114 in the 3D sensor space. The computing device then senses an orientation of the control object 114 and determines a surface of the control object 114. For example, a surface of a hand 114 can be the palm back of the hand 114. The computing device defines a control plane 302 tangential to the surface of the control object 114. For example, the computing device can define a control plane 302 tangential to the palm of a hand 114, as illustrated in FIG. 3.

The computing device then interprets a gesture in the 3D sensor space based on whether the movement of the control object 114 is more normal to the control plane 302 or more parallel to the control plane 302. In some implementations, the computing device calculates a trajectory (an angular trajectory) of the movement of the control object, and determines whether the gesture engages a virtual control based on whether the trajectory is more normal or more parallel to the control plane 302.

FIG. 4A illustrates that the control plane 402 is more normal to the control object's trajectory 404, according to definition 400A. The control plane 402 is more normal to the trajectory 404 when a normal vector of the control plane 402 is within a pre-determined range from a tangent vector of the trajectory 402 intersecting the control plane 402. For example, the control plane 402 is more normal to the trajectory 404 when the normal vector of the control plane 402 is within +/−10 degrees from the tangent vector of the trajectory 404. For example, the control plane 402 is more normal to the trajectory 404 when the normal vector of the control plane 402 is within +/−20 degrees or within +/−30 degrees from the tangent vector of the trajectory 404.

FIG. 4B depicts that the control plane 406 is more parallel to the control object's trajectory 408, according to definition 400B. The control plane 406 is more parallel to the trajectory 408 when the control plane 406 is within a pre-determined range from a tangent vector of the trajectory 408 intersecting the control plane 406. In one example, the control plane 406 is more parallel to the trajectory 408 when the control plane 406 is within +/−10 degrees from the tangent vector of the trajectory 408. In another example, the control plane 406 is more parallel to the trajectory 408 when the control plane 406 is within +/−20 degrees or within +/−30 degrees from the tangent vector of the trajectory 408.

In yet another example 500, the computing device displays an electronic book (e-book) 502 in its display 506 as illustrated in FIG. 5. The electronic book 502 also includes a page flip icon 504, indicating to a user that the user can use a swipe to left gesture in a 3D sensor space in front of the display 506 to flip to the next page, or use a swipe to right gesture in the 3D sensor space to flip to the previous page.

A user can flip to the next page by moving his hand in the 3D sensor space from right to left, with the hand's palm oriented vertically. The computing device senses the hand's trajectory moving horizontally from right to left, senses an orientation of hand, and determines a control plane of the hand (tangential to the palm) being more normal to the trajectory, and interprets the gesture as flipping to the next page. Similarly, the user can flip to the previous page by moving his hand in the 3D sensor space from left to right, with the hand's palm oriented vertically. The computing device senses the hand's trajectory moving horizontally from left to right, senses an orientation of the hand, determines a control plane of the hand (tangential to the palm of back of the hand) being more normal to the trajectory, and interprets the gesture as flipping to the previous page.

In some implementations, the user can move his hand horizontally within the 3D sensor space with the hand's palm facing downward. Since a control plane (tangential to the palm) is more parallel to the hand's trajectory, the computing device does not interpret the gesture as flipping pages of the electronic book 502. Thus to flip two pages forward from the current page, the user can move his hand from right to left with the palm oriented vertically, move his hand from left to right with the palm facing downward, then move his hand from right to left with the palm oriented vertically, all within the 3D sensor space. In contrast, without considering a control plane, such back-and-forth movement of the control object within the 3D sensor space would only flip one page forward, not two pages forward, in the electronic book 502.

Free Space Gesture Interface with a Flow Depicted in a Display

Applying the technology disclosed and with reference to FIG. 6, the computing device can automatically interpret a gesture of a control object 114 in the 3D sensor space as describe above relative to a flow 602 depicted in a display 604, by defining a control plane 608 of the control object 114. FIG. 6 shows a flow 602 flowing horizontally leftward in a display 604, and a control object's movement in the 3D sensor space in front of the display 608.

In example 600 shown in FIG. 6, the flow 602 can illustrate water flow's direction and velocity in a river, according to one implementation. The flow 602 can illustrate air flow's direction and velocity in a wind tunnel in another implementation. In yet another implementation, the flow 602 can also illustrate flowing particles in a tube or the travel of game pieces moving across the display.

The computing device automatically interprets a gesture of a control object 114 in the 3D sensor space relative to the flow 602 depicted in the display 604 by first sensing a movement 610 of the control object 114 in the 3D sensor space. The computing device then senses an orientation of the control object 114, defines a surface of the control object 114, and defines a control plane tangential to the surface of the control object 114. For example, the computing device can define a control plane 608 of a hand 114 as a plane tangential to the palm or back of the hand 114 as described earlier. The computing device interprets the gesture based on whether the control plane 608 and the movement of the control object 114 are more normal or more parallel to the flow 602 depicted in the display 604. The control plane 608 is more normal to the trajectory 610 when a normal vector 606 of the control plane 608 is within a pre-determined range from a tangent vector of the trajectory 610 intersecting the control plane 608. For example, the control plane 608 is more normal to the trajectory 610 when the normal vector 606 of the control plane 608 is within +/−10 degrees from the tangent vector of the trajectory 610. For example, the control plane 608 is more normal to the trajectory 610 when the normal vector 606 of the control plane 608 is within +/−20 degrees or within +/−30 degrees from the tangent vector of the trajectory 610.

In some implementations, the computing device calculates a three-dimensional velocity of the movement of the control object 114. The computing device then weights the control object's three-dimensional velocity by projecting the three-dimensional velocity onto a direction parallel to the flow direction 602. The percentage amount of the three-dimensional velocity projected onto the flow direction 602 is equal an inner product of a unit vector of the three-dimensional velocity and a unit vector of the flow. For example, if the control object is moving vertically in the 3D sensor space, the calculated velocity is zero, since the projection of the three-dimensional velocity onto the flow direction is zero.

The computing device also weights the velocity by a projection of a normal vector 606 of the control plane 608 onto a direction parallel to the flow 602 depicted in the display 604. For example, in FIG. 6, the normal vector 606 for the control plane 608 is at 20 degrees from the flow's direction 602. The weighting on the velocity then is equal to an inner product between the normal vector 606 and a unit vector of the flow's direction 602, or is equal to cosine (20 degrees)=0.94. For FIG. 6, the normal vector 606 for the control plane 608 is perpendicular to the flow's direction 602. Thus the weighting on the velocity has a value of 0 (i.e., the normal vector 606 has zero projection onto the flow's direction 602).

The computing device then determines an amount the gesture engages a virtual control of the flow depicted 602 in the display 604 based on the calculated velocity. For example, a user may swipe his hand from right to left with the hand's palm oriented vertically in the 3D sensor space. The computing device senses the movement of the hand (a control object), sense an orientation of the hand, and define a control plane tangential to the hand's palm or back (as described earlier). Since the normal vector 606 of the control plane 608 is in parallel to the flow 602 depicted in the display 604, there is no weighting (adjustment) to the velocity of the control object's movement 610. The computing device then can adjust the speed of the flow depicted in the display based on the movement's velocity. For example, the computing device can adjust the speed of the flow 602 as the same as the speed of the control object's movement 610. Thus the user can increase or decrease the speed of the flow 602 depicted in the display 604. In contrast, if the user moves his hand from right to left in the 3D sensor space with the hand's palm facing downward, the weighting on the velocity of the control object's movement is zero. That is, the calculated velocity of the control object's movement is zero. The computing device then determines that there is no change to the flow 602 (i.e., there is no engagement to the flow by the gesture).

A visual object depicted in a display can include one or more vectors. Applying the technology disclosed, a user can use a control object in a 3D sensor space to interact with the visual object relative to its corresponding vector. As shown in example 700, in FIG. 7, the flow 702 has a corresponding vector (e.g., its unit vector) pointing leftward in the horizontal direction. A user can use his hand to interact with the flow relative to the flow's corresponding vector. Since the normal vector 706 of the control plane 708 is normal to the flow 702 depicted in the display 704, there is weighting (adjustment) to the velocity of the control object's movement 710.

As another example 800 shown in FIG. 8, a flow 802 flows in variable direction and magnitude, as indicated by vectors of various directions and magnitudes at different locations in the display 804.

Applying the technology disclosed, the computing device senses a movement of the user's hand 114 (a control object) in the 3D sensor space as illustrated by the movement trajectory 810. In some implementations, the computing device determines a portion of the flow 802 engaged by the user's gesture. For example, the computing device can determine a path in the display 804 as projected by the user's hand movement and determine the user's hand movement engages a portion of the flow 802 intersecting the path. In other implementations, the computing device determines that the user's hand movement engages the whole flow 802 depicted in the display 804. The computing device then senses orientation of the hand, and defines a control plane 808 tangential to a surface (e.g., palm or back) of the hand. The computing device determines an amount of the hand gesture engages the vectors of the flow 802 using the normal vector 806 based on whether the control plane and the hand's movement are more normal or more parallel to the vectors as described earlier.

FIG. 9 depicts a sphere depicted in a display 904. The sphere (e.g., a virtual earth globe model) has an axial vector 902 corresponding to the axis of the sphere. Applying the technology disclosed, the computing device senses a movement of the user's hand (a control object) in the 3D sensor space as illustrated by the movement trajectory 910. The computing device then senses orientation of the hand, and defines a control plane 908 tangential to a surface (e.g., palm or back) of the hand 114. The computing device then determines an amount of the hand gesture engages a virtual control of the visual sphere based on whether the control plane 908 and the hand's movement are more normal or more parallel to the axial vector 902. For example, the computing device can determine that the hand gesture engages the visual sphere if the normal vector 906 of the control plane 908 is perpendicular (e.g., within +/−10, +/−20, or +/−30 degrees) to the axial vector 902 of the visual sphere. The computing device then determines an amount of interaction by the hand gesture with the visual sphere by a distance or speed of the hand's movement trajectory in a direction perpendicular to the axial vector 902 in the 3D sensor space. Here, a direction perpendicular to the axial vector 902 is not necessarily parallel to the display 904. The computing device can calculate a rotational angle to rotate the visual sphere proportional to a distance and direction of the hand gesture. In example 900, the computing device can rotate the visual sphere (the virtual earth globe model) from west to east for 10 degrees for every 20 cm the user's hand moves from left to right in a horizontal direction, while the hand's palm is oriented vertically. Or the computing device can rotate the virtual earth globe model from west to east for 10 degrees, if the user places his hand in a region right to the sphere in the 3D sensor region and moves his hand 20 cm closer to the display 904 (while the hand's palm is oriented vertically). The computing device can also change a rotation speed of the visual sphere by the hand's velocity in a direction perpendicular to the axial vector 902 in the 3D sensor space.

An icon (or an operating system or an application) can have one or more vectors. FIG. 10 shows an icon 1002 representing a photo album in a display 1004. The photo album icon 1002 has two vectors: a downward vector corresponds to minimizing the photo album icon. A rightward vector corresponds to selecting the photo album icon (e.g., selecting and displaying content of the photo album).

Applying the technology disclosed, the computing device senses a movement of a user's hand (a control object) in the 3D sensor space as illustrated by the movement trajectory 1010 in FIG. 10. The computing device then senses orientation of the hand, and defines a control plane 1008 tangential to a surface (e.g., palm or back) of the hand 114. Using the normal vector 1006, the computing device then determines a control of the photo album icon 1002 by the hand gesture based on the direction of the hand movement in the 3D sensor space relative to the vectors associated with the photo album icon 1002. In example 1000, if the hand is moving downward (e.g., with the hand's palm facing downward), the computing device determines that the hand gesture enables minimizing the photo album icon 1002. If the hand is moving rightward (e.g., with the hand's palm oriented vertically), the computing device determines the hand gesture enables selecting the photo album icon 1002.

Applying the technology disclosed, engagement gesture can be a gesture that can be engaged, and/or non-engaged with a virtual control (knob, slider, etc. displayable on a screen or other presentation device), virtual object (river in the above example, bongo drums, virtual fruit to slash, etc., combinations) or non-object (screen scroll, audio volume, other OS controls, and combinations). A control object (hand portion, tool portion, etc., and combinations) can provide control information to a machine using an engagement gesture. An engagement gesture can become engaged with a virtual control (or object or non-object) by: (i) presence of the control object in the interaction zone; and (ii) (in the technology disclosed) having a palm angle within an engagement range (e.g., angle of zero or more but less than 90 degrees). The control object can disengage with the virtual control (or virtual object or non-object) by changing the angle of the palm to vertical (90 degrees). Selection from among multiple virtual controls (or virtual objects or non-objects) can be achieved by proximity or by presence in a zone (i.e., a region of the interactive zone defined in space).

Free Space Gesture Interface by Distinguishing a Control Object and a Sub-Object of the Control Object Applying the technology disclosed, the computing device can also automatically interpreting gestures of a control object by distinguishing the control object and a sub-object of the control object. A sub-object of a control object is a portion of the control object. In the example 1100 shown in FIG. 11, a control object can be a hand 1104. A sub-object of the control object can be a finger (1102, 1106, 1108) of the hand (as illustrated in FIG. 11), or the hand's palm or back 1108. By distinguishing the control object and the sub-object (or additional sub-objects of the control object) and noting interactions or relative positions and/or motions therebetween, the technology disclosed can enable user interaction in a limited size of interaction space (e.g., the control object is relatively far away from the intended target, or in a small space like aircraft cabins).

The computing device can interpret a user's gestures in a 3D sensor space as navigating a multi-layer presentation tree such as a menu (as illustrated in FIG. 12) or a file list by distinguishing between a control object (of the user) and a sub-object of the control object.

The computing device first senses a movement of the control object in the 3D sensor space, and interprets the movement of the control object as scrolling through a particular level 1202 of the multi-layer presentation tree 1200. For example, the computing devices senses a location of a hand 1104 (a control object) of a user in the 3D sensor space, and determines that the location corresponds to the level B including menu items B1, B2 . . . , and B5 of the menu illustrated above. As the hand moves up and down in the 3D sensor space, the computing devices interprets the gesture as moving up and down in the level B of the menu.

The computing device senses a movement of a finger (a sub-object such as 1102, 1106, 1108, 1110) of the hand 1104, and interprets the movement (e.g., stretching, pointing) of the finger as selecting a different level in the menu. For example, the user moves his hand to a location in the 3D sensor space corresponding to the menu item B3, and points a finger at the menu item B3. The computing device senses the movement of the hand and the finger, and interprets the finger gesture as selecting a different level B3 including menu items B3a and B3b. Afterwards, the user uses his hand to move up and down in the 3D sensor space, and the computing device interprets the hand gesture as scrolling through (up and down) the different level B3. The user can also stretch and rotate his finger in the 3D sensor space to move up a hierarchical level in the menu. The computing device senses the rotating finger and interprets the gesture as selecting the level B including menu items B1 to B5. Afterwards, the user users his hand to move up down in the 3D sensor space, and the computing device interprets the hand gesture as scrolling up and down the menu level B.

The computing device can also sense a movement of another sub-object of the control object to perform additional controls of the menu. For example, the user can rotate his hand to change between different presentation layouts (e.g., a list view, an icon view, a list view with short descriptions, etc.) of the menu. The computing device senses the hand's back (a sub-object) and a rotational movement of the back. In response to the rotational gesture, the computing device changes the presentation layout of the menu (e.g., by cycling through different presentation layouts of the menu). That is, the user can use one control object (hand) and two attributes of the control object (finger movement and hand rotation) to navigate and change presentation layout of a user interface (the multi-layer presentation tree).

Applying the technology disclosed, more than one hand attribute (velocity vector, palm normal, curvature of a finger, rotation matrix of hand, etc., and combinations) in the 3D sensor space can be mapped to more than one context hierarchy at the same time by the computing device with the 3D sensor. This enables the user to traverse multiple paths through a set of menus at the same time. Examples include (i) traversing the menus with one hand and (ii) traversing menu paths with more than one hand. For example, a user can use one hand to change channel and the other hand to set volume at the same time. For example, a user can change channel by pushing with one hand, while turning down the volume by rotation motion of a finger on the one hand.

The computing device can determine a control of a virtual control by a control object (e.g., a hand) by distinguishing the control object and a sub-object of the control object. In some implementations, the computing device determines whether the control object engages the virtual control and interprets movement of the sub-object as gestures controlling the virtual control, if the control object engages the virtual control.

A virtual control can present to a user a control function of the computing device without a physical switch or dial. In example 1300A, the computing device can present a mute control function with a graphical icon 1302 in the computing device's display 1304, as illustrated in FIG. 13A.

The mute control function has a controllable parameter in it's ON or OFF state. A user controls the mute control function by moving his hand in front of the mute control icon 1302, and changes the state of the mute control function (from ON to OFF, or from OFF to ON) by stretching a finger of his hand.

The computing device automatically determines the user's control of the mute control function by first sensing a location of the user's hand (a control object) in the 3D sensor space. The computing device determines whether the hand engages the mute control function based the location of the hand. If the user's hand is in front of the mute control icon 1302 in the 3D sensor space, the computing device determines that the hand engages the mute control function. The computing device senses a movement of a finger (a sub-object) of the hand. If the computing device has determined that the hand has engaged the mute control function, the computing device then interprets the movement of the figure (e.g., finger stretching) as a gesture controlling the mute control function, e.g., turning on or off the mute control function.

FIG. 13B shows another example 1300B of a virtual control. FIG. 13B depicts a channel control icon 1308 in the display 1306 of the computing device, representing a channel control function. The channel control function allows a user to move up or down of a list of channels (e.g., TV channels, radio channels), or a list of items, such as a play list of songs or videos. The user controls the channel control function by moving his hand in front of the channel control icon 1308 (in the 3D sensor space), and moving up the list of channels by rotating his hand clockwise, or moving down the list of channels by rotating his hand counter-clockwise.

The computing device automatically determines the user's control of the channel control function by first sensing a location of the user's hand (a control object) in the 3D sensor space. The computing devices determines that the hand engages the channel control function if the hand is in front of the channel control icon 1308 in the 3D sensor space. The computing device then senses an orientation of the hand and defines a surface of the hand such as the hand's palm or back. The computing device defines a control plane tangential to the hand's palm (or back) as described earlier. If the computing device has determined that the hand has engaged the channel control function, the computing device then interprets the direction (or rotation) of the control plane as a gesture controlling the channel control function. The computing device interprets a clockwise rotation of the control plane as moving up the list of channels, and interprets a counter-clockwise rotation of the control plane as moving down the list of channels.

Duplicating Visual Objects with Free Space Gestures

Applying the technology disclosed, the computing device can automatically interpret gestures in the 3D sensor space relative to objects depicted in the display of the computing device. In some implementations, the computing device can interpret a slicing gesture in the 3D sensor space as duplicating objects 1402, 1404, 1406 depicted in the display 1408. In example 1400 illustrated in FIG. 14, a user uses his hand 1414 and quickly moves his hand 1414 through the 3D sensor space in front of the computing device's display 1408. The hand's movement 1412 is mapped to a path 1410 on the display 1408 that intersects objects B and C. Objects intersecting the path 1410 (B and C) are duplicated. Objects that are not intersected by the path 1410 (e.g., A) are not duplicated by the hand gestures.

The computing device automatically interprets the hand gesture illustrated in FIG. 14 by first sensing a speed of a movement of the hand (a control object) moving through the 3D sensor space. The computing device interprets the movement 1412 as a path 1410 on the display 1408 if the speed of the movement exceeds a pre-determined threshold (e.g., 20 or 30 or 40 cm per second). If the hand is only hovering in front of display 1408 with a slower speed (less than the threshold), then the movement 1412 is not interpreted by the computing device as a path on the display 1408. The computing device then duplicates one or more objects 1402, 1404, 1406 that intersect the interpreted path 1410 on the display 1408. The computing device may duplicates objects 1402, 1404, 1406 intersecting the path 1410 if the objects have been previously selected.

As described in U.S. Prov. App. No. 61/816,487, a user can train the computing device the gestures performed in the 3D sensor space described herein. The output of feedback of the training can be displayed to the user to exam the integrity of the training process.

FIG. 15 is a representative method 1500 of automatically interpreting a gesture of a control object in a three dimensional sensor space. Flowchart 1500 can be implemented by one or more processors configured to receive or retrieve information, process the information, store results, and transmit the results. Other implementations may perform the actions in different orders and/or with different, varying, alternative, modified, fewer or additional actions than those illustrated in FIG. 15. Multiple actions can be combined in some implementations. For convenience, this flowchart is described with reference to the system that carries out a method. The system is not necessarily part of the method.

At action 1502, a movement of the control object is sensed in the three dimensional sensor space. In one implementation, the control object is a hand. In another implementation, the control plane is tangential to a palm or back of the hand.

At action 1512, an orientation of the control object is sensed.

At action 1522, a control plane is defined tangential to a surface of the control object.

At action 1532, the gesture is interpreted based on whether the movement of the control object is more normal to the control plane or more parallel to the control plane. In some implementations, the gesture is interpreted based on whether the movement of the control object is more normal to the control plane or more parallel to the control plane. Such implementations include calculating an angular trajectory of the movement of the control object and determining whether the gesture engages a virtual control based on whether the trajectory is more normal or more parallel to the control plane.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

FIG. 16 illustrates a method 1600 of automatically interpreting a gesture of a control object in a three dimensional sensor space relative to a flow depicted in a display. Flowchart 1600 can be implemented by one or more processors configured to receive or retrieve information, process the information, store results, and transmit the results. Other implementations may perform the actions in different orders and/or with different, varying, alternative, modified, fewer or additional actions than those illustrated in FIG. 16. Multiple actions can be combined in some implementations. For convenience, this flowchart is described with reference to the system that carries out a method. The system is not necessarily part of the method.

At action 1602, a movement of the control object is senses in the three dimensional sensor space. In another implementation, the control plane is tangential to a palm or back of the hand.

At action 1612, an orientation of the control object is sensed.

At action 1622, a control plane is defined tangential to a surface of the control object.

At action 1632, the gesture is interpreted based on whether the control plane and the movement of the control object are more normal or more parallel to the flow depicted in the display. In one implementation, the control object is a hand.

In some implementations, the gesture is interpreted based on whether the control plane and the movement of the control object are more normal or more parallel to the flow depicted in the display. Such implementations include calculating a velocity and weighted velocity of the movement of the control object, the weighted velocity being weighted by a projection of the velocity onto a direction parallel to the flow depicted in the display and by a projection of a normal vector of the control plane onto the direction parallel to the flow depicted in the display and determining an amount the gesture engages a virtual control of the flow depicted in the display based on the calculated velocity.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

FIG. 17 shows a flowchart 1700 of navigating a multi-layer presentation tree using gestures of a control object in a three dimensional sensor space by distinguishing between the control object and a sub-object of the control object. Flowchart 1700 can be implemented by one or more processors configured to receive or retrieve information, process the information, store results, and transmit the results. Other implementations may perform the actions in different orders and/or with different, varying, alternative, modified, fewer or additional actions than those illustrated in FIG. 17. Multiple actions can be combined in some implementations. For convenience, this flowchart is described with reference to the system that carries out a method. The system is not necessarily part of the method.

At action 1702, a movement of the control object is sensed in the three dimensional sensor space. In some implementations, the control object is a hand and the sub-object is a finger of the hand. In other implementations, the sub-object is a portion of the control object.

At action 1712, the movement of the control object is interpreted as scrolling through a particular level of the multi-layer presentation tree (menu, file list).

At action 1722, a movement of the sub-object is sensed in the three dimensional sensor space and the movement of the sub-object is interpreted as selecting a different level in the multi-layer presentation tree. In one implementation, the different level is either a deeper or higher level from the particular level. In other implementations, the movement of the control object is subsequently interpreted as scrolling through the different level of the multi-layer presentation tree.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

FIG. 18 depicts a representative method 1800 of navigating a multi-layer presentation tree using gestures of a control object in a three dimensional sensor space by distinguishing between the control object and one or more sub-objects of the control object. Flowchart 1800 can be implemented by one or more processors configured to receive or retrieve information, process the information, store results, and transmit the results. Other implementations may perform the actions in different orders and/or with different, varying, alternative, modified, fewer or additional actions than those illustrated in FIG. 18. Multiple actions can be combined in some implementations. For convenience, this flowchart is described with reference to the system that carries out a method. The system is not necessarily part of the method.

At action 1802, a movement of the control object is sensed in the three dimensional sensor space. In some implementations, the control object is a hand. In other implementations, the first and second sub-objects of the control objects are a finger, a palm, or a back of the hand.

At action 1812, the movement of the control object is interpreted as traversing through a particular level of the presentation tree.

At action 1822, a movement of a first sub-object of the control object is sensed in the three dimensional sensor space and the movement of the first sub-object is interpreted as selecting a different level in the presentation tree. In one implementation, the different level is either deeper or higher level from the particular level. In other implementations, the movement of the control object is subsequently interpreted as traversing through the different level of the presentation tree.

At action 1832, a movement of a second sub-object of the control object is sensed in the three dimensional sensor space and the movement of the second sub-object is interpreted as selecting a different presentation layout from a current presentation layout of the presentation tree. In other implementations, the presentation tree is subsequently presented in the different presentation layout.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

FIG. 19 shows a method 1900 of automatically determining a control to a virtual control by a control object in a three dimensional sensor space by distinguishing the control object and a sub-object of the control object. Flowchart 1900 can be implemented by one or more processors configured to receive or retrieve information, process the information, store results, and transmit the results. Other implementations may perform the actions in different orders and/or with different, varying, alternative, modified, fewer or additional actions than those illustrated in FIG. 19. Multiple actions can be combined in some implementations. For convenience, this flowchart is described with reference to the system that carries out a method. The system is not necessarily part of the method.

At action 1902, a location of the control object is sensed in a three dimensional sensor space. In one implementation, the control object is a hand.

At action 1912, a determination is made whether the control object engages the virtual control based on the location of the control object.

At action 1922, a movement of the sub-object of the control object is sensed in the three dimensional sensor space. In one implementation, the sub-object is a finger of the hand.

At action 1932, the movement of the sub-object is interpreted as a gesture controlling the virtual control if the control object engages the virtual control. In other implementations, the movement of the sub-object is interpreted as a gesture controlling the virtual control. Such implementations include identifying a controllable parameter of the virtual control and selecting or adjusting the controllable parameter based on the movement of the sub-object.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

FIG. 20 is a flowchart 2000 of automatically determining a control to a virtual control by a control object in a three dimensional sensor space. Flowchart 2000 can be implemented by one or more processors configured to receive or retrieve information, process the information, store results, and transmit the results. Other implementations may perform the actions in different orders and/or with different, varying, alternative, modified, fewer or additional actions than those illustrated in FIG. 20. Multiple actions can be combined in some implementations. For convenience, this flowchart is described with reference to the system that carries out a method. The system is not necessarily part of the method.

At action 2002, a location of the control object is sensed in a three dimensional sensor space. In one implementation, the control object is a hand.

At action 2012, a determination is made whether the control object engages the virtual control based on the location of the control object.

At action 2022, an orientation of the control object is sensed.

At action 2032, a control plane is defined tangential to a surface of the control object. In one implementation, the surface is tangential to a palm or a back of the hand.

At action 2042, a direction of the control plane is interpreted as a gesture controlling the virtual control if the control object engages the virtual control. In some implementations, a direction of the control plane is interpreted as a gesture controlling the virtual control. Such implementations include identifying a controllable parameter of the virtual control and selecting or adjusting the controllable parameter based on the direction of the control plane.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

FIG. 21 depicts a representative method 2100 of automatically interpreting a gesture of a control object in a three dimensional space relative to one or more objects depicted in a display. Flowchart 2100 can be implemented by one or more processors configured to receive or retrieve information, process the information, store results, and transmit the results. Other implementations may perform the actions in different orders and/or with different, varying, alternative, modified, fewer or additional actions than those illustrated in FIG. 21. Multiple actions can be combined in some implementations. For convenience, this flowchart is described with reference to the system that carries out a method. The system is not necessarily part of the method.

At action 2102, a speed of a movement of the control object moving through the three dimensional sensor space is sensed.

At action 2112, the movement is interpreted as a path on the display if the speed of the movement exceeds a pre-determined threshold.

At action 2122, one or more of the objects that intersect the interpreted path are duplicated in the display. In some implementations, the objects are pre-selected.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of automatically interpreting a gesture of a control object, in a three-dimensional (3D) sensor space using a 3D sensor, as a first gesture or a second gesture, the method including:
    processing an output of a video camera of the 3D sensor thereby sensing a trajectory of movement of the control object in any direction in the 3D sensor space;
    further processing the output of the video camera of the 3D sensor thereby sensing an orientation of the control object;
    determining by processing the output of the video camera of the 3D sensor a surface of the control object;
    defining a control plane that remains tangent to the surface of the control object throughout the movement of the control object in any direction in the 3D sensor space, the control plane being defined by processing the output of the video camera of the 3D sensor and the sensed orientation of the control object;
    interpreting the gesture of the control object as the first gesture or the second gesture by comparing a direction of the trajectory of the movement of the control object to (i) a normal vector that is normal to the defined control plane and (ii) a surface of the defined control plane, wherein:
    the gesture is the first gesture when the direction of the trajectory of the movement of the control object is within a pre-determined range of the normal vector of the control plane; and
    the gesture is the second gesture when the direction of the trajectory of the movement of the control object is parallel to the surface of the control plane, within a pre-determined range,
    such that the gesture is the first gesture when the direction of the movement of the trajectory of the control object is more normal to the surface of the control plane than parallel to the surface of the control plane and the gesture is the second gesture when the direction of the movement of the trajectory of the control object is more parallel to the surface of the control plane than normal to the surface of the control plane.

2. The method of claim 1, wherein:
    the control object is a hand; and
    the control plane is tangent to a palm or back of the hand.

3. The method of claim 1, wherein the interpreting of the gesture includes:
    calculating an angular trajectory of the movement of the control object; and
    determining whether the gesture engages a virtual control based on whether the trajectory is normal or parallel to the control plane.

4. A method of automatically interpreting a gesture of a control object, in a three-dimensional (3D) sensor space relative to a flow depicted in a display, as a first gesture or a second gesture, the method including:
    processing an output of a video camera of a 3D sensor thereby sensing a movement of the control object in any direction in the 3D sensor space using the 3D sensor;
    further processing the output of the video camera of the 3D sensor thereby sensing an orientation of the control object and determining a surface of the control object;
    defining a control plane that remains tangent to the surface of the control object throughout the movement of the control object in any direction in the 3D sensor space, the control plan being defined by processing the output of the video camera of the 3D sensor and the sensed orientation of the control object; and
    interpreting the gesture of the control object as the first gesture or the second gesture by comparing a direction of the flow to (i) a normal vector that is normal to the defined control plane and (ii) a surface of the defined control plane, wherein:
    the gesture is the first gesture when the direction of the flow is within a pre-determined range of the normal vector of the control plane; and
    the gesture is the second gesture when the direction of the flow is parallel to the surface of the control plane, within a pre-determined range,
    such that the gesture is the first gesture when the direction of the flow is more normal to the surface of the control plane than parallel to the surface of the control plane, and the gesture is the second gesture when the direction of the flow is more parallel to the surface of the control plane than normal to the surface of the control plane.

5. The method of claim 4, wherein:
the control object is a hand; and
the control plane is tangent to a palm or back of the hand.

6. The method of claim 4, wherein the interpreting of the gesture includes:
calculating a velocity and weighted velocity of the movement of the control object, the weighted velocity being weighted by a projection of the velocity onto a direction parallel to the flow depicted in the display and by a projection of a normal vector of the control plane onto the direction parallel to the flow depicted in the display; and
determining an amount the gesture engages a virtual control of the flow depicted in the display based on the calculated velocity.

7. A method of navigating a multi-layer presentation tree using gestures of a control object in a three-dimensional (3D) sensor space, using a 3D sensor, by distinguishing between the control object and a sub-object of the control object, the method including:
processing an output of a video camera of the 3D sensor thereby sensing a movement of the control object in any direction in the 3D sensor space using a control plane that remains tangent to a surface of the control object throughout the movement of the control object in any direction in the 3D sensor space, the control plane being defined by processing the output of the video camera of the 3D sensor and a sensed orientation of the control object;
interpreting by a computing device a direction of the movement of the control object as scrolling through a particular level of the multi-layer presentation tree when the direction of the movement of the control object is more normal with respect to the surface of the tangent control plane than parallel with respect to the surface of the control plane; and
further processing the output of the video camera of the 3D sensor thereby sensing a movement of the sub-object in the 3D sensor space, and interpreting the movement of the sub-object as selecting a different level in the multi-layer presentation tree, the different level being either a deeper or higher level from the particular level, and subsequently interpreting by the computing device the movement of the control object as scrolling through the different level of the multi-layer presentation tree.

8. The method of claim 7, wherein the sub-object is a portion of the control object.

9. The method of claim 7, wherein the control object is a hand and the sub-object is a finger of the hand.

10. A method of navigating a multi-layer presentation tree using gestures of a control object in a three-dimensional (3D) sensor space, using a 3D sensor, by distinguishing between the control object and one or more sub-objects of the control object, the method including:
processing an output of a video camera of the 3D sensor thereby sensing a movement of the control object in any direction in the 3D sensor space using a control plane that remains tangent to a surface of the control object throughout the movement of the control object in any direction in the 3D sensor space, the control plane being defined by processing the output of the video camera of the 3D sensor and a sensed orientation of the control object determined by processing the output of the video camera of the 3D sensor;
interpreting a direction of the movement of the control object as traversing through a particular level of the presentation tree when the direction of the movement of the control object is one of (i) more normal with respect to the surface of the tangent control plane than parallel with respect to the surface of the control plane and (ii) more parallel with respect to the surface of the tangent control plane than normal with respect to the surface of the control plane;
further processing the output of the video camera of the 3D sensor thereby sensing a movement of a first sub-object of the control object in the 3D sensor space and interpreting the movement of the first sub-object as selecting a different level in the presentation tree, the different level being either deeper or higher level from the particular level, and subsequently interpreting the movement of the control object as traversing through the different level of the presentation tree; and
further processing the output of the video camera of the 3D sensor thereby sensing a movement of a second sub-object of the control object in the 3D sensor space and interpreting the movement of the second sub-object as selecting a different presentation layout from a current presentation layout of the presentation tree, and subsequently presenting the presentation tree in the different presentation layout.

11. The method of claim 10, wherein:
the control object is a hand; and
the first and second sub-objects of the control objects are a finger, a palm, or a back of the hand.

12. A method of automatically determining by a computing device a control to a virtual control by a control object in a three-dimensional (3D) sensor space, using a 3D sensor, by distinguishing the control object and a sub-object of the control object, the method including:
processing an output of a video camera of a 3D sensor thereby sensing a location of the control object in a 3D sensor space using a control plane that remains tangent to a surface of the control object throughout a movement of the control object in any direction in the 3D space, the control plane being defined by processing the output of the video camera of the 3D sensor and a sensed orientation of the control object determined by processing the output of the video camera of the 3D sensor;
determining by a computing device whether the control object engages the virtual control based on the location of the control object;
further processing the output of the video camera of the 3D sensor thereby sensing a direction of a movement of the sub-object of the control object in any direction in the 3D sensor space; and
interpreting by a computing device the direction of the movement of the sub-object as a gesture controlling the virtual control if the control object engages the virtual control and when the direction of the movement of the control object is one of (i) more normal with respect to the surface of the tangent control plane than parallel with respect to the surface of the control plane and (ii) more parallel with respect to the surface of the tangent control plane than normal with respect to the surface of the control plane.

13. The method of claim 12, wherein:
the control object is a hand; and
the sub-object is a finger of the hand.

14. The method of claim 12, wherein the interpreting the movement of the sub-object as a gesture controlling the virtual control includes:

identifying a controllable parameter of the virtual control; and selecting or adjusting the controllable parameter based on the movement of the sub-object.

15. A method of automatically determining, by a computer device, a control to a virtual control by a control object in a three-dimensional (3D) sensory space, the method including:

processing an output of a video camera of the 3D sensor thereby sensing a location of the control object in the 3D sensor space using a 3D sensor;

determining by a computing device whether the control object engages the virtual control based on the location of the control object;

further processing the output of the video camera of the 3D sensor thereby sensing an orientation of the control object and determining a surface of the control object;

defining a control plane that remains tangent to the surface of the control object throughout a movement of the control object in any direction in the 3D sensor space, the control plane being determined by processing the output of the video camera of the 3D sensor and the sensed orientation of the control object; and interpreting by a computing device a direction of a normal vector that is normal to a surface of the control plane that is tangent to the determined surface of the control object, the direction of the normal vector being interpreted with respect to a direction of a trajectory of a movement of the control object that creates a gesture controlling the virtual control, if the control object engages the virtual control.

16. The method of claim 15, wherein:

the control object is a hand; and the control surface is tangent to a palm or a back of the hand.

17. The method of claim 15, wherein the interpreting of the direction includes:

identifying a controllable parameter of the virtual control; and selecting or adjusting the controllable parameter based on the direction of the normal vector of the control plane with respect to the direction of the trajectory of the movement of the control object.

18. A method of automatically interpreting by a computing device a gesture of a control object in a 3D sensor space relative to one or more objects depicted in a display, the method including:

processing an output of a video camera of a 3D sensor thereby sensing a speed of a movement of the control object moving in any direction through the 3D sensor space using the 3D sensor;

interpreting by a computing device the movement as a path on the display if the speed of the movement exceeds a pre-determined threshold; and duplicating one or more of the objects in the display that intersect the interpreted path.

19. The method of claim 18, wherein the objects are pre-selected.

20. The method of claim 1, further including determining the control plane is normal to the trajectory when the normal vector of the control plane is within +/−10 degrees from a tangent vector of the trajectory.

21. The method of claim 4, further including determining an amount that a hand gesture engages vectors describing the flow using the normal vector based on whether the control plane and the hand's movement are determined to be normal or parallel to the vectors of the flow.

22. The method of claim 7, further including: (i) traversing menus responsive to movement of a first sub-object including a first hand and (ii) traversing menu paths responsive to movement of a second sub-object including a second hand.

23. The method of claim 12, further including interpreting a user moving the user's hand in front of a mute control icon as engaging a mute control function; and interpreting a movement of a finger sub-object of the hand as changing a state of the mute control from on to off or from off to on.

24. The method of claim 15, further including interpreting a hand gesture engages a visual sphere if the normal vector of the control plane is perpendicular, within a range of +/−10 degrees, to an axial vector defined for the visual sphere.

25. The method of claim 18, further including the movement as a path on the display if the speed of the movement exceeds a pre-determined threshold of 20 cm per second.

26. The method of claim 1, wherein the first gesture is an interaction gesture for interacting with an object and the second gesture in a non-interaction gesture.

* * * * *